(12) United States Patent
Toyota et al.

(10) Patent No.: US 7,133,086 B2
(45) Date of Patent: Nov. 7, 2006

(54) IMAGE DISPLAY AND MANUFACTURING METHOD OF THE SAME INCLUDING A THIN FILM TRANSISTOR AND A STORAGE CAPACITOR

(75) Inventors: Yoshiaki Toyota, Kokubunji (JP); Toshihiko Itoga, Hino (JP); Hajime Akimoto, Ome (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/046,979

(22) Filed: Jan. 17, 2002

(65) Prior Publication Data

US 2002/0154252 A1 Oct. 24, 2002

(30) Foreign Application Priority Data

Apr. 24, 2001 (JP) ............................. 2001-125219

(51) Int. Cl.
*G02F 1/1343* (2006.01)
(52) U.S. Cl. .......................................... 349/38; 349/43
(58) Field of Classification Search .................. 349/38, 349/43, 39, 138, 143, 147
See application file for complete search history.

(56) References Cited

U.S. PATENT DOCUMENTS 5,721,601 A * 2/1998 Yamaji et al. .............. 349/138
5,814,529 A * 9/1998 Zhang .......................... 438/30
5,998,838 A * 12/1999 Tanabe et al. ............... 257/347
6,046,790 A * 4/2000 Hara et al. ................... 349/172
6,317,173 B1 * 11/2001 Jung et al. ..................... 349/42
6,493,046 B1 * 12/2002 Ueda ............................. 349/38
6,545,730 B1 * 4/2003 Hwang ......................... 349/43

FOREIGN PATENT DOCUMENTS

JP 11-271812 10/1999

OTHER PUBLICATIONS

SID 99 Digest, pp. 172-185.

* cited by examiner

*Primary Examiner*—Dung T. Nguyen
*Assistant Examiner*—Thoi V. Duong
(74) *Attorney, Agent, or Firm*—Mattingly, Stanger, Malur & Brundidge, P.C.

(57) ABSTRACT

An image display has gate-lines and signal-lines in a matrix shape, and has thin film transistors each having: an island-shaped semiconductor layer having source region, drain region, and channel region sandwiched between them; a first insulation film formed between the semiconductor layer and a gate electrode of the same layer as that of the gate-lines; an interlayer insulation film formed above the semiconductor layer; and a source electrode and a drain electrode existing in the same layer as that of the signal-lines. Each capacitor has: a storage electrode of the same layer as that of the gate-lines; an insulation film formed on the storage electrode and being in contact therewith; and an electrode formed on the insulation film and being in contact therewith and existing in the same layer as that of the signal-lines.

7 Claims, 19 Drawing Sheets

IMAGE DISPLAY AND MANUFACTURING METHOD OF THE SAME INCLUDING A THIN FILM TRANSISTOR AND A STORAGE CAPACITOR

BACKGROUND OF THE INVENTION

The invention relates to an image display of high contrast and a low cost and its manufacturing method.

Since a polysilicon thin film transistor (hereinafter, referred to as TFT) has excellent performance, a circuit can be constructed. As an example which utilizes such a feature, the active-matrix liquid crystal display disclosed in "Society for Information Display International Symposium Digest of Technical Papers", p. 172, 1999, can be mentioned. According to such a display, by constructing a part of a peripheral driver circuit by the polysilicon TFT, the number of connecting terminals of a pixel portion and the peripheral driver circuit can be reduced, and an image can be displayed at high precision. FIG. 2 shows a constructional diagram of the conventional liquid crystal display using the polysilicon TFT. FIG. 3 shows a plan view of a layout of a pixel 40.

The display of FIG. 2 comprises a gate driver circuit 30, a drain driver circuit 31, and a display area 32. The gate driver circuit 30 and drain driver circuit 31 are constructed by CMOS TFTs 33. In the display area 32, gate-lines 37 and signal-lines 38 are formed in a matrix shape. Each pixel in the display area 32 is constructed by a pixel TFT 34 and a storage capacitor 36 for holding a voltage which is applied to the liquid crystal. Each of those elements has the following functions. First, a voltage is applied to a gate of the pixel TFT 34 from the gate driver circuit 30 and a circuit between a source and a drain is made conductive.

An image signal from the drain driver circuit 31 is supplied to the liquid crystal via the pixel TFT 34, so that the liquid crystal enters a display state corresponding to the signal voltage. The voltage is stored in a liquid crystal capacitor 35 and the storage capacitor 36 until a selective voltage is applied to the gate again at the next period. By providing the storage capacitor 36, a drop of the voltage applied to the liquid crystal due to a leakage current of the TFT can be suppressed and the liquid crystal display having high contrast can be provided. FIG. 4 shows a cross sectional view taken along the line A–A' in FIG. 3. The liquid crystal capacitor 35 is a capacitor comprising a pixel electrode 13—a liquid crystal layer 21—an opposite electrode 22. By applying a signal voltage to the pixel electrode 13 and changing alignment of the liquid crystal, transmittance of light from a backlight 26 is controlled and a video image is displayed.

According to the conventional liquid crystal display using the polysilicon TFT, since the backlight 26 is irradiated to a polycrystalline silicon layer 4 and a photogenerated carrier is excited, the leakage current increases and the voltage applied to the liquid crystal drops, so that the contrast deteriorates. It is necessary to increase the storage capacitance in order to suppress the drop of the voltage applied to the liquid crystal. However, as shown in FIG. 4, the conventional storage capacitor 36 comprises: a first capacitor which is formed by a polycrystalline silicon layer 14—an insulation film 3 of the same layer as that of a gate insulation film—a storage electrode 8 of the same layer as that of the gate-lines; and a second capacitor which is formed by the storage electrode 8 of the same layer as that of the gate-lines—an interlayer insulation film 10—a passivation film 12—the pixel electrode 13. Since an interval between the electrodes of the second capacitor is 10 or more times as wide as that of the first capacitor, a capacitance of the second capacitor is smaller enough than that of the first capacitor to be ignored. Further, since the interval between the electrodes of the first capacitor is determined by a thickness of gate insulation film, an area has to be increased in order to increase the capacitance. If the area of the storage capacitor is increased, however, an aperture ratio of the pixel decreases and the contrast further deteriorates. The more a pixel area is reduced in order to raise resolution, the more such a problem becomes worse. Therefore, a technique for increasing the capacitance per unit area is necessary.

As a countermeasure against the problem, as disclosed in JP-A-11-271812, there is a method whereby by laminating metal films forming a gate electrode and a storage electrode and the insulation films and patterning them at the same time, insulation films are previously formed onto gate-lines, gate electrode, and storage electrode, and a passivation film and an interlayer insulation film above the storage electrode are etched, thereby forming a storage capacitor comprising the storage electrode, insulation film, and pixel electrode (ITO). According to such a method, the storage capacitance can be increased by thinning the thickness of insulation film constructing the second capacitor. There is, however, a case where the thickness of insulation film forming the capacitor becomes uneven due to an ITO etchant. There is also a case where a reactant layer of the ITO and the insulation film is formed and the storage capacitance decreases.

To prevent the above drawbacks, it is necessary that a barrier metal is formed between the insulation film and the ITO. As disclosed in JP-A-11-271812, there is a method whereby the insulation film and metal film are previously laminated onto the storage electrode, the passivation film and the interlayer insulation film are removed, and thereafter, the pixel electrode is formed. According to such a method, since the metal film plays a role of an etch stopper, the uniform thickness of insulation film under the metal film can be maintained. According to such a method, however, the step of laminating the storage electrode film, insulation films, and metal film and patterning the laminate film and the step of etching only the metal film and the insulation films when a contact hole for connecting the signal-lines and the gate-lines is formed are further added.

According to the method disclosed in JP-A-11-271812, a stairway over which the pixel electrode constructing the storage capacitor rides enlarges, and there is a case where the pixel electrode is disconnected due to such a large stairway.

SUMMARY OF THE INVENTION

The invention is made to provide an image display in which contrast is improved owing to an increase in capacitance of a storage capacitor and a manufacturing cost is low.

According to one aspect of the invention, there is provided an image display having a plurality of thin film transistors and a plurality of capacitors on a substrate whose surface is insulative, wherein a plurality of gate-lines and a plurality of signal-lines which cross the plurality of gate-lines in a matrix shape are formed on the substrate, each of the thin film transistors has: an island-shaped semiconductor layer having a source region, a drain region, and a channel region sandwiched between them; a first insulation film formed between the island-shaped semiconductor layer and a gate electrode of the same layer as that of the gate-lines; an interlayer insulation film formed above the island-shaped semiconductor layer; and a source electrode and a drain electrode which are come into contact with the source region and the drain region via an opening formed in the interlayer insulation film and which exist in the same layer as that of the signal-lines, and each of the capacitors has: a storage electrode of the same layer as that of the gate-lines; a second insulation film formed on the storage electrode so as to be in contact therewith; and an electrode which is formed on the second insulation film so as to be in contact therewith and which exists in the same layer as that of the signal-lines.

In place of constructing the capacitor by the second insulation film formed on the storage electrode so as to be in contact therewith and the electrode which is formed on the second insulation film so as to be in contact therewith and which exists in the same layer as that of the signal-lines, it can be also constructed by: the second insulation film formed on the storage electrode and the interlayer insulation film so as to be in contact with them; and the electrode which is formed on the second insulation film so as to be in contact therewith and which exists in the same layer as that of the signal-lines.

According to another aspect of the invention, there is provided a manufacturing method of an image display, comprising the steps of: forming a plurality of island-shaped semiconductor layers onto a substrate; forming a first insulation film onto the island-shaped semiconductor layers; forming a gate electrode and a storage electrode onto the first insulation film; forming a source region, a drain region, and a channel region sandwiched between them onto the island-shaped semiconductor layers; forming a second insulation film onto the storage electrode; forming interlayer insulation films onto regions above the gate electrode and the storage electrode; simultaneously removing the interlayer insulation film of a contact hole portion and the interlayer insulation film above the storage electrode; and simultaneously forming an electrode on the second insulation film and a source electrode and a drain electrode which are connected to the source region and the drain region.

The means for increasing the storage capacitance proposed so far is a method of using a pixel electrode (ITO) as an electrode forming the storage capacitor in order to improve an aperture ratio as much as possible and lest a mask is added. According to such a method, however, since the insulation film and the barrier metal are preliminarily laminated onto the storage electrode and worked as mentioned above, the number of manufacturing steps remarkably increases and a throughput deteriorates. According to one aspect of the invention, the signal-lines and the electrodes of the same layer as that of the source/drain electrode are used as upper electrodes of the storage capacitor. By selecting a metal which prevents a reduction in storage capacitance as a barrier metal of the source/drain electrode, the capacitance per unit area is extremely improved, so that the aperture ratio can be raised. Further, unevenness of the thickness of insulation film due to the ITO etchant does not occur either. Therefore, the image display of high contrast and a low price can be provided owing to the improvement of the throughput. The over-ride stairway of the pixel electrode can be also reduced and the disconnection of the pixel electrode can be effectively prevented.

By using the above structure, the following advantages are also obtained. Since the capacitance per unit area is large, a structure such that a frame memory is built in the pixel portion which has been practically impossible in the conventional structure can be realized. As a memory, a DRAM, FRAM (ferroelectric memory), or the like can be used. Owing to a similar effect, even in the case where the memory is built in the panel peripheral portion, there are also merits such that the area is small and a high integration degree can be realized.

DESCRIPTION OF THE EMBODIMENTS

Embodiments of the invention will be described in detail hereinbelow. According to the invention, a TFT active-matrix circuit and a peripheral driver circuit are formed on the same substrate.

(Embodiment 1)

Figure 1:
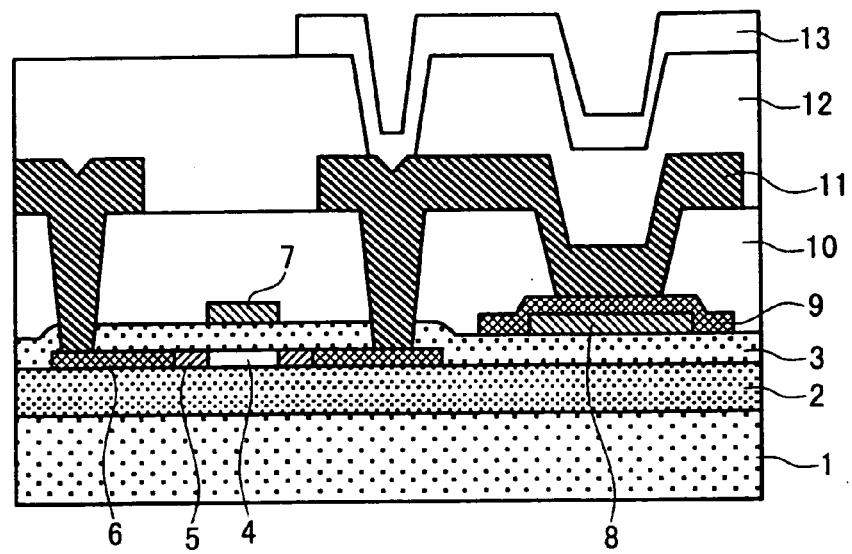
FIG. 1 is a cross sectional view of a thin film transistor and a capacitor according to the embodiment 1.
Figure 3:
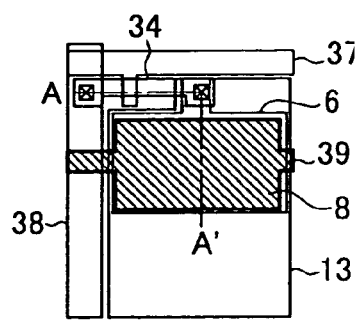
FIG. 3 is a plan view showing a layout of a pixel in the conventional liquid crystal display.
Figure 5:
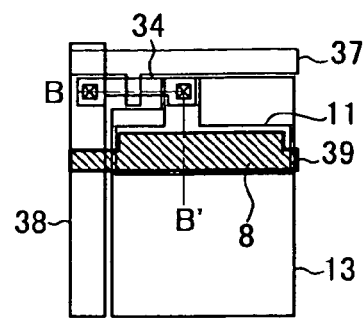
FIG. 5 is a plan view showing a layout of a pixel in a liquid crystal display according to the invention.
Figure 4:
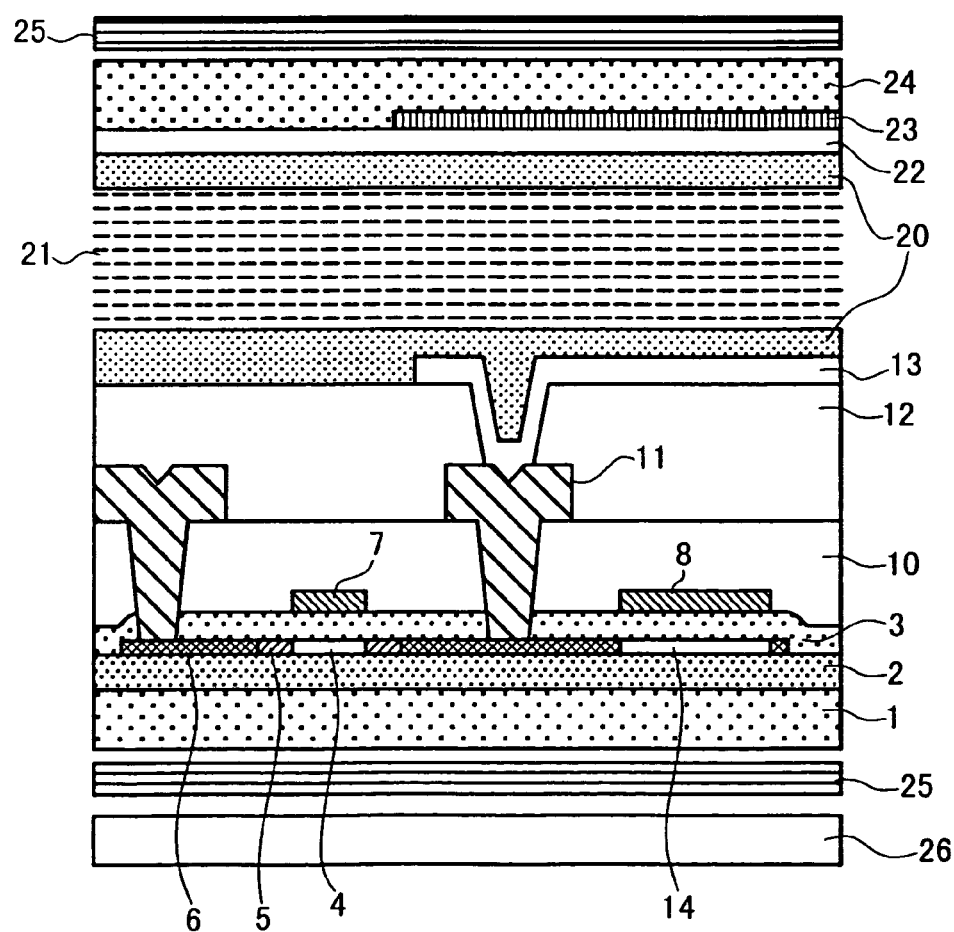
FIG. 4 is a cross sectional view of the conventional liquid crystal display.

A constructional diagram of an image display in the first embodiment of the invention is similar to that of FIG. 3. FIG. 5 is a plan view of a layout of the pixel 40. FIG. 1 is a cross sectional view taken along the line B–B' in FIG. 5 and shows a construction after the pixel electrode 13 was formed. A pixel TFT and a storage capacitor constructed by the storage electrode 8—a second insulation film 9—a source/drain electrode 11 are shown, respectively. A manufacturing method of the TFT and the storage capacitor will now be described with reference to FIGS. 6A to 6E.

Figure 6A:
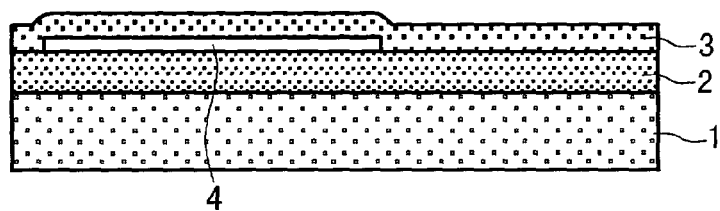
FIGS. 6A to 6E are cross sectional views showing manufacturing steps of the embodiment 1.
Figure 6B:
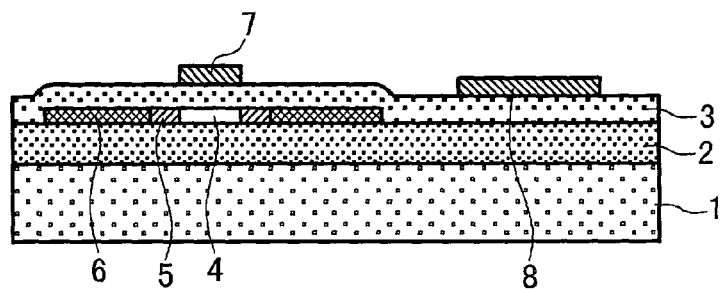
Figure 6C:
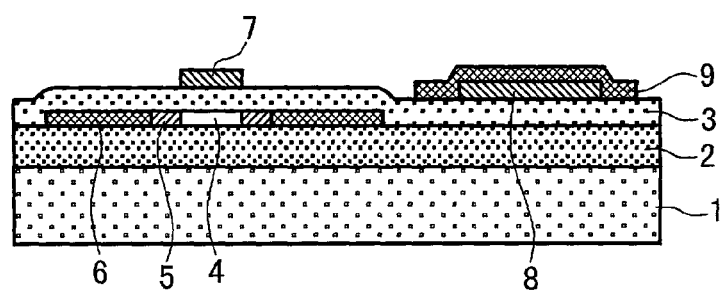
Figure 6D:
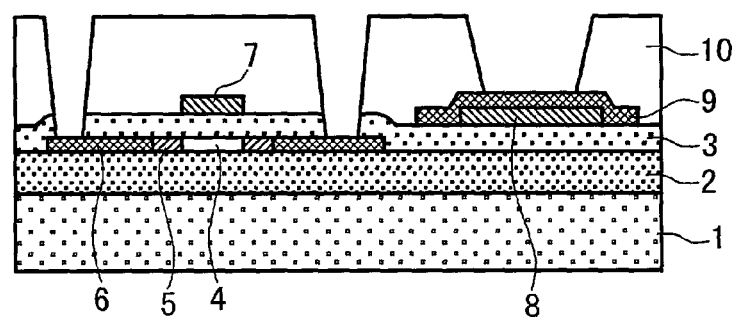
Figure 6E:
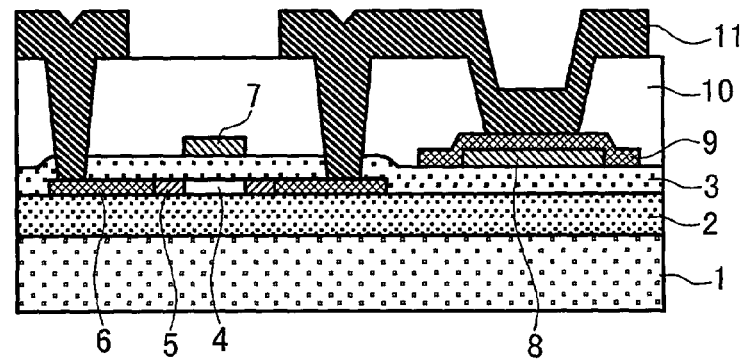

A buffer layer 2 having a thickness of 300 nm and made of a silicon oxide film is deposited onto a glass substrate 1 whose strain point is equal to or lower than 670° C. by a plasma CVD method and, further, an amorphous silicon layer having a thickness of 50 nm is deposited by the plasma CVD method. Subsequently, the amorphous silicon layer is crystallized by irradiating an XeCl excimer laser, and the island-shaped polycrystalline silicon layer 4 is formed by a well-known photo-etching process. After that, the first insulation film 3 (in the embodiment, silicon oxide film) having a thickness of 100 nm and serving as a gate insulation film is deposited by the plasma CVD method (FIG. 6A). Further, an Al layer having a thickness of 250 nm and serving as gate-lines, a gate electrode, and a storage electrode is deposited by a sputtering method. The Al layer is patterned by the well-known photo-etching process, thereby forming a gate electrode 7 and, simultaneously, forming the storage electrode 8. After the gate electrode 7 and storage electrode 8 are formed, for an n-channel TFT, a high-resistivity n-type polycrystalline silicon layer 5 is formed by ion implantation by using the gate electrode 7 as a mask. After that, a low-resistivity n-type polycrystalline silicon layer 6 is formed by using a resist as a mask. At this time, a length of high-resistivity polycrystalline silicon layer 5 is set to 1 μm. After that, although not shown, in order to form a TFT CMOS, for a p-channel TFT, a low-resistivity p-type polycrystalline silicon layer is formed by ion implantation by using the gate electrode 7 as a mask (FIG. 6B). The second insulation film 9 (in the embodiment, silicon nitride film) having a thickness of 50 nm is deposited by the plasma CVD method and patterned by the well-known photo-etching process (FIG. 6C). The interlayer insulation film 10 having a thickness of 500 nm and made of silicon oxide is formed so as to cover the whole surface and the silicon oxide layer is removed by the well-known photo-etching process, thereby opening a contact through hole. At this time, the interlayer insulation film formed on the second insulation film is also simultaneously etched. In the embodiment, since the interlayer insulation film and the first insulation film are made of the same material (silicon oxide), the contact through hole can be formed by performing the etching process once. Since an etching rate of the silicon nitride film as a second insulation film is lower than that of silicon oxide film as a first insulation film, the silicon nitride film is hardly etched when the contact through hole is opened, and only the interlayer insulation film on the second insulation film can be selectively etched (FIG. 6D). After that, a metal film of five layers of Ti—TiW—Al—TiW—Ti is formed and the source/drain electrode 11 is formed by the well-known photo-etching process simultaneously with the formation of signal-lines (FIG. 6E). The Ti layer as a bottom layer is formed on the low-resistivity polycrystalline silicon layer 6 and the second insulation film and plays a role for reduction of a contact resistance between the low-resistivity polycrystalline silicon layer 6 and Al, prevention of diffusion of Al into polysilicon, prevention of a decrease in storage capacitance which is caused due to the formation of a low dielectric layer, and the like. The Ti layer as a top layer plays a role for reducing a contact resistance with the pixel electrode 13. After that, the passivation film 12 having a thickness of 500 nm and made of silicon nitride is formed so as to cover the whole surface. Further, the pixel electrode 13 and source/drain electrode 11 are come into contact with each other via the contact through hole formed in the passivation film 12 (FIG. 1).

According to the embodiment, since the first insulation film and the second insulation film can be individually formed, relative permittivity of the second insulation film can be set to be higher than that of the first insulation film, and the storage capacitance can be increased to a value larger than that of the storage capacitor formed by the polysilicon film—the first insulation film—the storage electrode. Moreover, since a thickness of the second insulation film can be set to be thinner than that of the first insulation film, the capacitance can be further increased. Therefore, an area of the storage capacitor can be reduced and the contrast can be improved owing to the improvement of the aperture ratio. Since the over-ride stairway of the pixel electrode is similar to the conventional one, the disconnection of the pixel electrode can be also effectively prevented.

According to the embodiment, since the peripheral driver circuit and the image display area are simultaneously formed, the capacitor constructing the peripheral driver circuit can be miniaturized in a manner similar to the image display area. Thus, the area of the peripheral driver circuit can be reduced and a narrow edge of the liquid crystal display can be realized.

(Embodiment 2)

Figure 7:
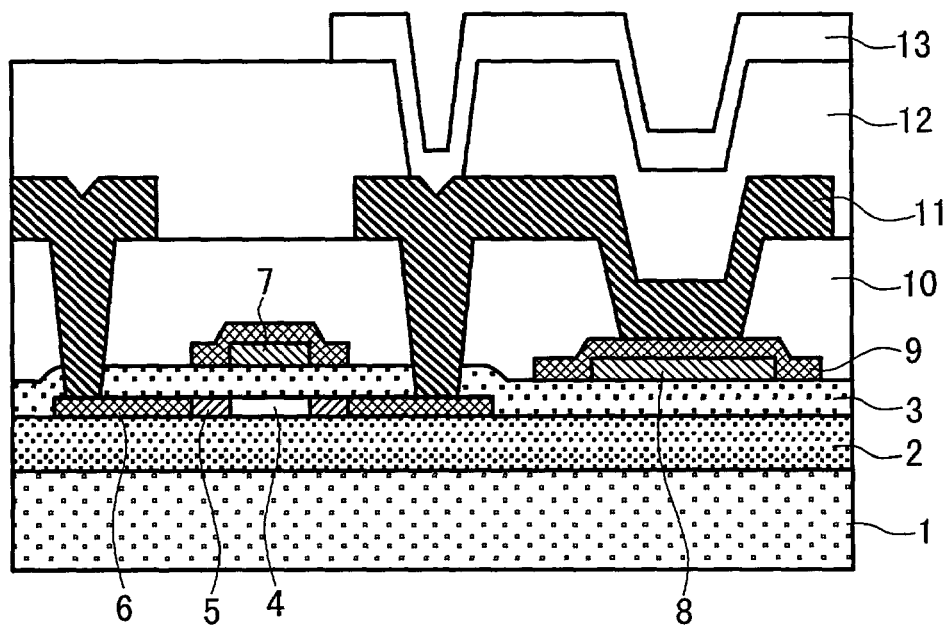
FIG. 7 is a cross sectional view of a thin film transistor and a capacitor according to the embodiments 2 and 3.

FIG. 7 is a cross sectional view taken along the line B–B' in FIG. 5 in the second embodiment of the invention and shows a construction obtained after the pixel electrode 13 was formed. FIG. 7 shows a structure in which when the second insulation film 9 in the embodiment 1 is patterned, portions formed on the upper surface and the side surface of the gate electrode are left.

The second insulation films in the contact portions between the signal-lines and the gate-lines are removed. According to the embodiment, since a fringe capacitance between the high-resistivity polycrystalline silicon layer 5 and the gate electrode increases and a resistance of the high-resistivity polycrystalline silicon layer 5 decreases, the performance of the TFT is improved.

(Embodiment 3)

The third embodiment of the invention is an example obtained by simplifying the manufacturing steps in the first embodiment and its cross sectional view is similar to FIG. 7. A manufacturing method in the third embodiment will now be described with reference to FIGS. 8A to 8E.

Figure 8A:
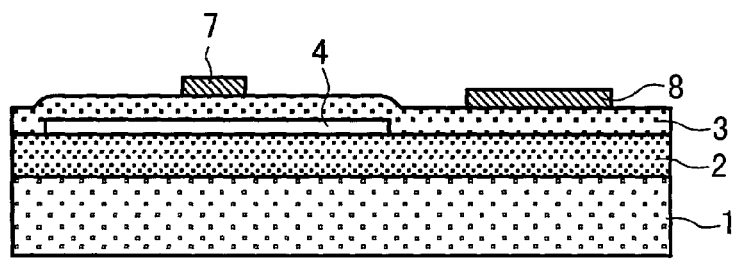
FIGS. 8A to 8E are cross sectional views showing manufacturing steps of the embodiment 3.
Figure 8B:
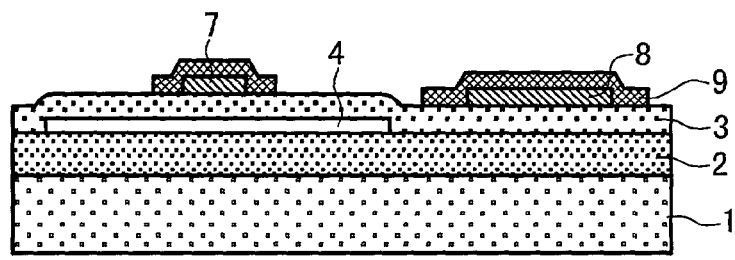
Figure 8C:
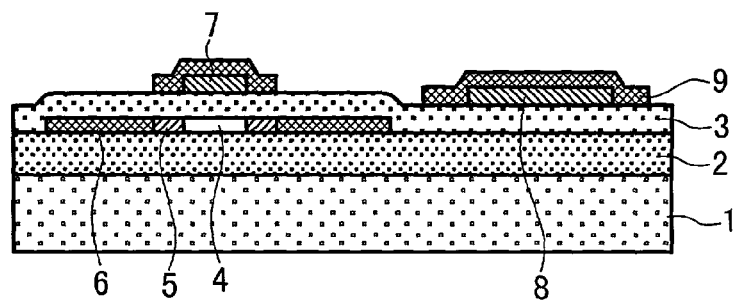
Figure 8D:
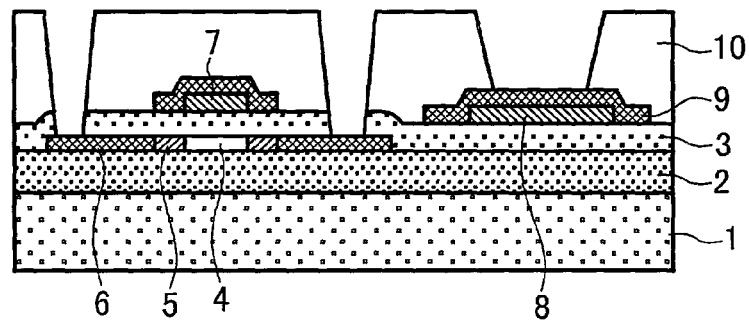
Figure 8E:
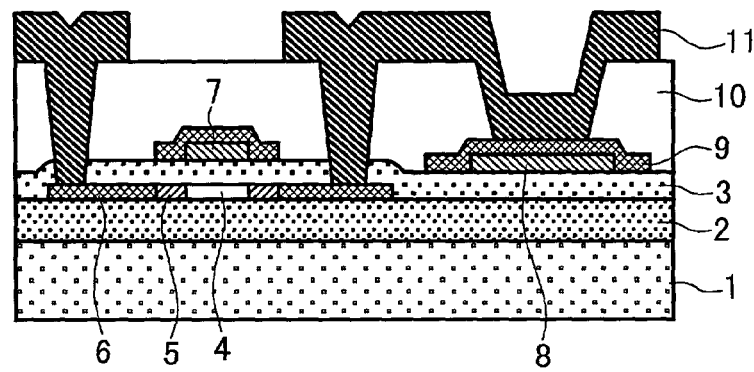

First, in a manner similar to the embodiment 1, the buffer layer 2, island-shaped polycrystalline silicon layer 4, and first insulation film 3 (silicon oxide film in the embodiment) are formed onto the glass substrate 1 (FIG. 8A). An Al layer having a thickness of 250 nm and serving as gate-lines, a gate electrode, and a storage electrode is deposited by the sputtering method. The Al layer is patterned by the well-known photo-etching process, thereby forming the gate electrode 7 and, simultaneously, forming the storage electrode 8. The second insulation film 9 (in the embodiment, silicon nitride film) having a thickness of 50 nm is further deposited by the plasma CVD method and patterned by the well-known photo-etching process (FIG. 8B). After that, regions of the p-channel TFT and the capacitor are covered by a resist and phosphorus ions are implanted. At this time, since a dose of the phosphorus ions in a lower portion of the second insulation film decreases, the high-resistivity n-type polycrystalline silicon layer 5 and low-resistivity n-type polycrystalline silicon layer 6 are simultaneously formed. After that, although not shown, in order to form a TFT CMOS, for the p-channel TFT, a low-resistivity p-type polycrystalline silicon layer is formed by the ion implantation by using the gate electrode 7 as a mask (FIG. 8C). After that, the interlayer insulation film 10 is formed and a contact through hole is opened through a processing step similar to that in the embodiment 1 (FIG. 8D) and the source/drain electrode 11 is formed (FIG. 8E). After that, the passivation film 12 and pixel electrode 13 are formed, thereby obtaining the structure of FIG. 7.

According to the embodiment, since the high-resistivity n-type polycrystalline silicon layer and the low-resistivity n-type polycrystalline silicon layer can be simultaneously formed, the manufacturing steps can be simplified.

(Embodiment 4)

Figure 9:
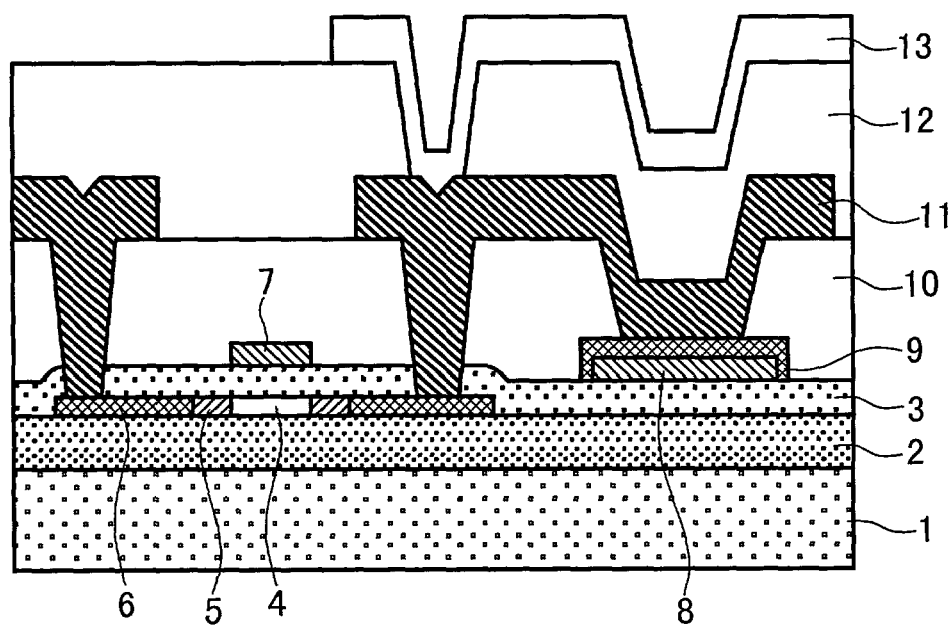
FIG. 9 is a cross sectional view of a thin film transistor and a capacitor according to the embodiment 4.

FIG. 9 is a cross sectional view taken along the line B–B' in FIG. 5 in the second embodiment of the invention and shows a construction obtained after the pixel electrode 13 was formed. The pixel TFT and the storage capacitor constructed by the storage electrode 8—the second insulation film 9—the source/drain electrode 11 are shown, respectively. A manufacturing method of the TFT and the storage capacitor will now be described with reference to FIGS. 10A to 10E.

Figure 10A:
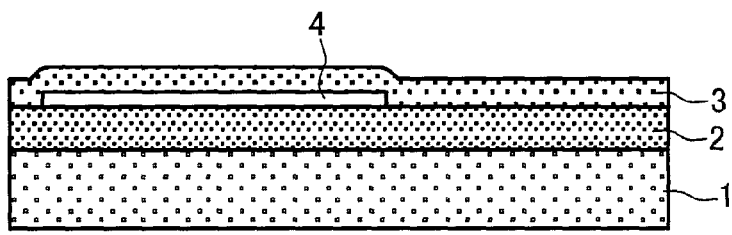
FIGS. 10A to 10E are cross sectional views showing manufacturing steps of the embodiment 4.
Figure 10B:
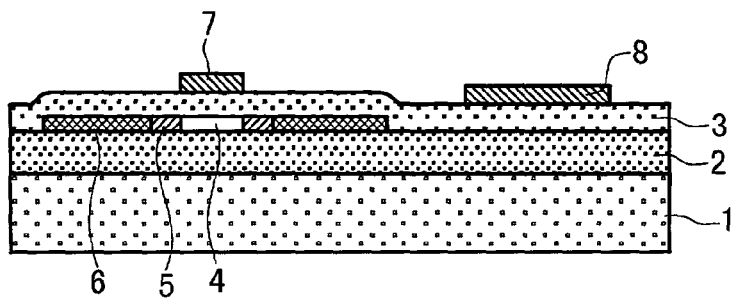
Figure 10C:
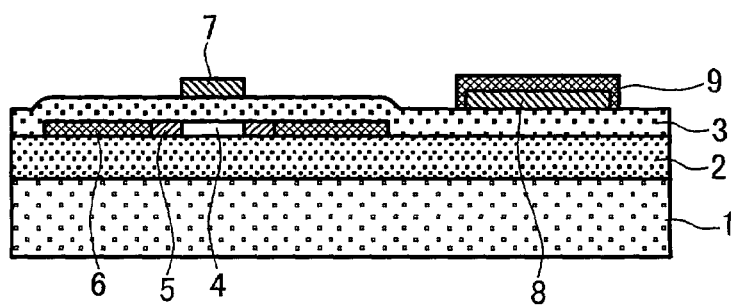
Figure 10D:
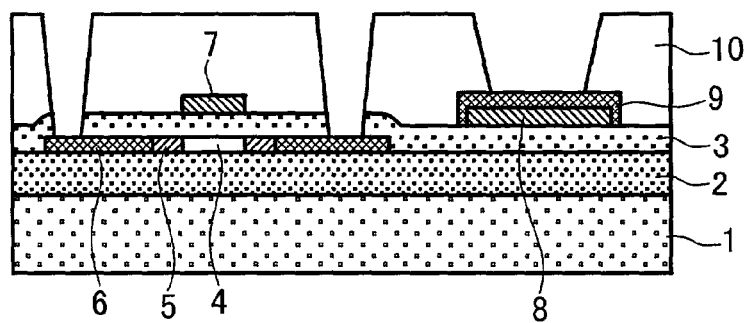
Figure 10E:
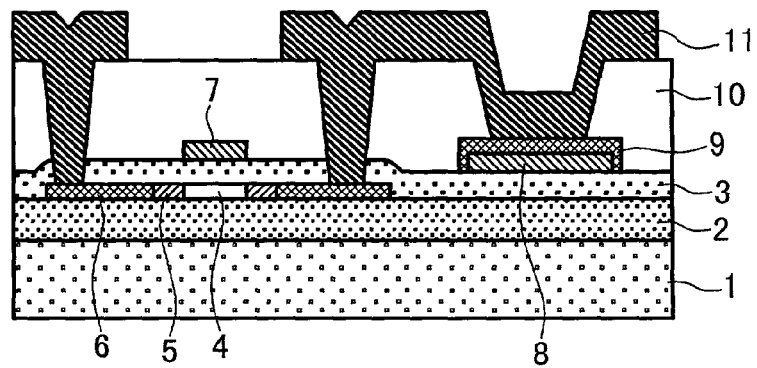

First, in a manner similar to the embodiment 1, the buffer layer 2, island-shaped polycrystalline silicon layer 4, and first insulation film 3 (silicon oxide film in the embodiment) are formed onto the glass substrate 1 (FIG. 10A). An Al layer having a thickness of 300 nm and serving as gate-lines, a gate electrode, and a storage electrode is deposited by the sputtering method. The Al layer is patterned by the well-known photo-etching process, thereby forming the gate electrode 7 and, simultaneously, forming the storage electrode 8. Further, in a manner similar to the embodiment 1, the high-resistivity n-type polycrystalline silicon layer 5, the low-resistivity n-type polycrystalline silicon layer 6, and a low-resistivity p-type polycrystalline silicon layer are formed (FIG. 10B). Subsequently, the gate electrode 7 and storage electrode 8 are oxidized by an anodic oxidization and the second insulation film 9 (aluminum oxide film) is formed. After that, the second insulation films formed on the gate electrode 7, gate-lines 37, and storage-lines 39 are removed by the well-known photo-etching process (FIG. 10C). After that, the interlayer insulation film 10 is formed and a contact through hole is opened through a processing step similar to that in the embodiment 1 (FIG. 10D) and the source/drain electrode 11 is formed (FIG. 10E). After that, the passivation film 12 and pixel electrode 13 are formed, thereby obtaining the structure of FIG. 9.

According to the embodiment, since the storage electrode is oxidized and the second insulation film can be simultaneously formed, a film thickness distribution in the substrate can be controlled at high precision.

(Embodiment 5)

Figure 11:
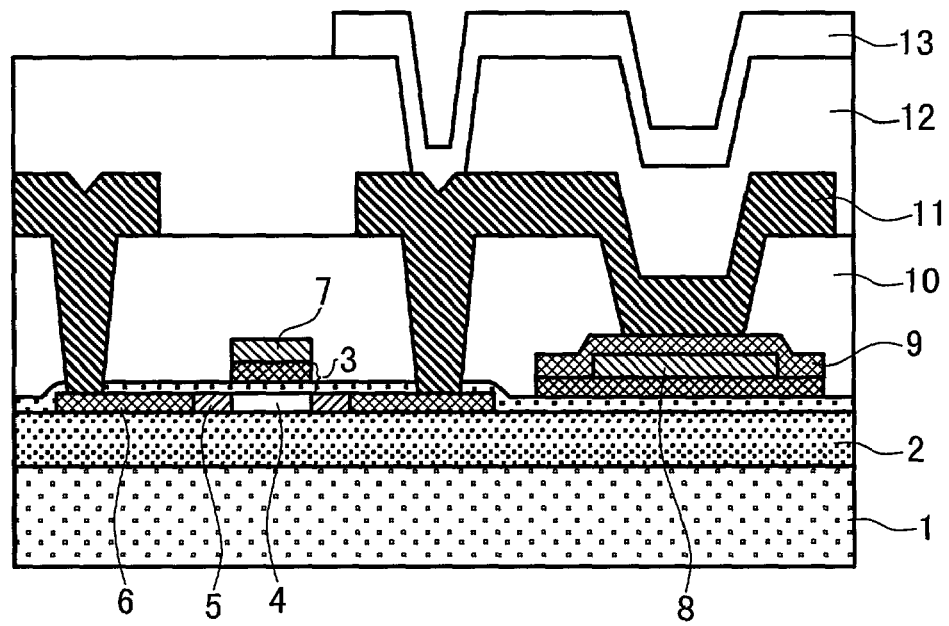
FIG. 11 is a cross sectional view of a thin film transistor and a capacitor according to the embodiment 5.

FIG. 11 is a cross sectional view taken along the line B–B' in FIG. 5 in the fifth embodiment of the invention and shows a construction obtained after the pixel electrode 13 was formed. The pixel TFT and the storage capacitor constructed by the storage electrode 8—the second insulation film 9—the source/drain electrode 11 are shown, respectively. A manufacturing method of the TFT and the storage capacitor will now be described with reference to FIGS. 12A to 12E.

Figure 12A:
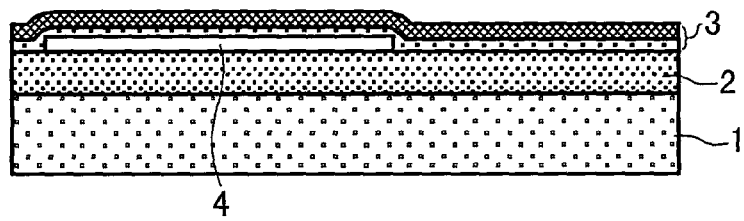
FIGS. 12A to 12E are cross sectional views showing manufacturing steps of the embodiment 5.
Figure 12B:
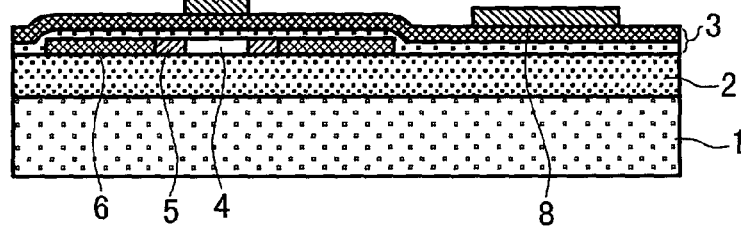
Figure 12C:
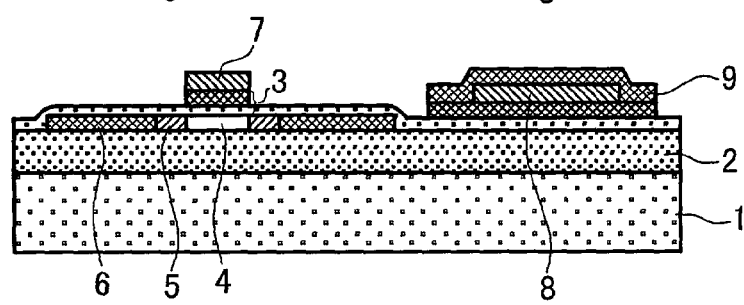
Figure 12D:
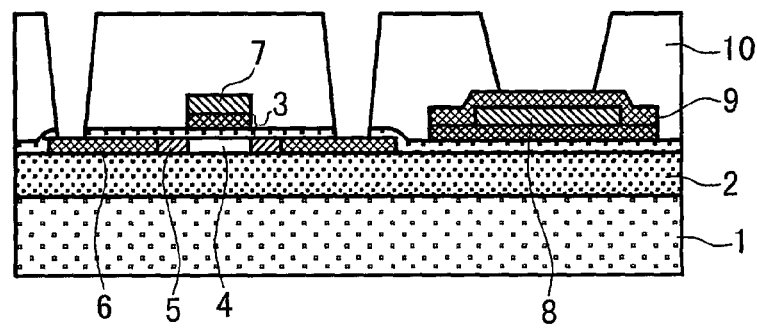
Figure 12E:
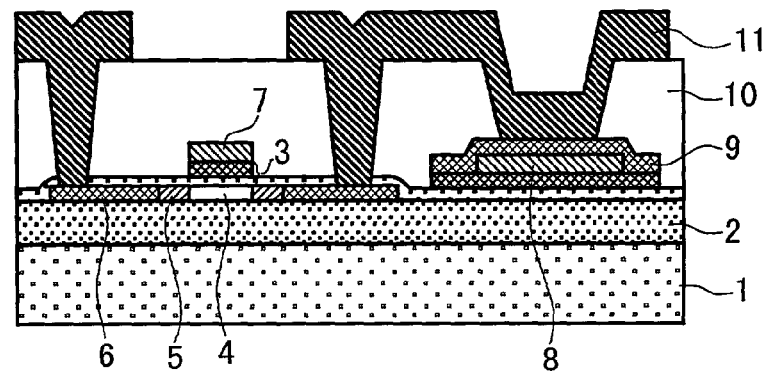

First, in a manner similar to the embodiment 1, the buffer layer 2 and island-shaped polycrystalline silicon layer 4 are formed onto the glass substrate 1. After that, the first insulation film 3 (laminate film of a silicon oxide film and aluminum oxide film in the embodiment) having a thickness of 100 nm and serving as a gate insulation film is formed (FIG. 12A). In this case, since a capacitor of the first insulation film becomes a series capacitor of the silicon oxide film and the aluminum oxide film, its equivalent relative permittivity is lower than that of a single layer film of the aluminum oxide film. Further, in a manner similar to the embodiment 1, the gate electrode 7 and storage electrode 8 are formed, and the high-resistivity n-type polycrystalline silicon layer 5, the low-resistivity n-type polycrystalline silicon layer 6, and a low-resistivity p-type polycrystalline silicon layer are formed (FIG. 12B). Subsequently, the second insulation film 9 (aluminum oxide film in the embodiment) having a thickness of 50 nm is formed by the sputtering method and patterned by the well-known photo-etching process. In the embodiment, since the upper layer of the first insulation film and the second insulation film are made of the same material (aluminum oxide), the aluminum oxide film on the low-resistivity n-type polycrystalline silicon layer 6 is removed (FIG. 12C). After that, the interlayer insulation film 10 is formed and a contact through hole is opened through a processing step similar to that in the embodiment 1 (FIG. 12D) and the source/drain electrode 11 is formed (FIG. 12E). After that, the passivation film 12 and pixel electrode 13 are formed, thereby obtaining the structure of FIG. 11.

According to the embodiment, since the aluminum oxide film having the high relative permittivity is used as an upper layer of the gate insulation film, the gate capacitance is increased and the performance of the TFT is improved. By using the silicon oxide film as a lower layer of the gate insulation film, the number of interface states between the polysilicon layers and the gate insulation film can be reduced and reliability of the TFT is improved. Therefore, by using the high dielectric constant film as an upper layer of the gate insulation film and by using the silicon oxide film as a lower layer, the high performance and high reliability of the TFT can be realized.

(Embodiment 6)

Figure 13:
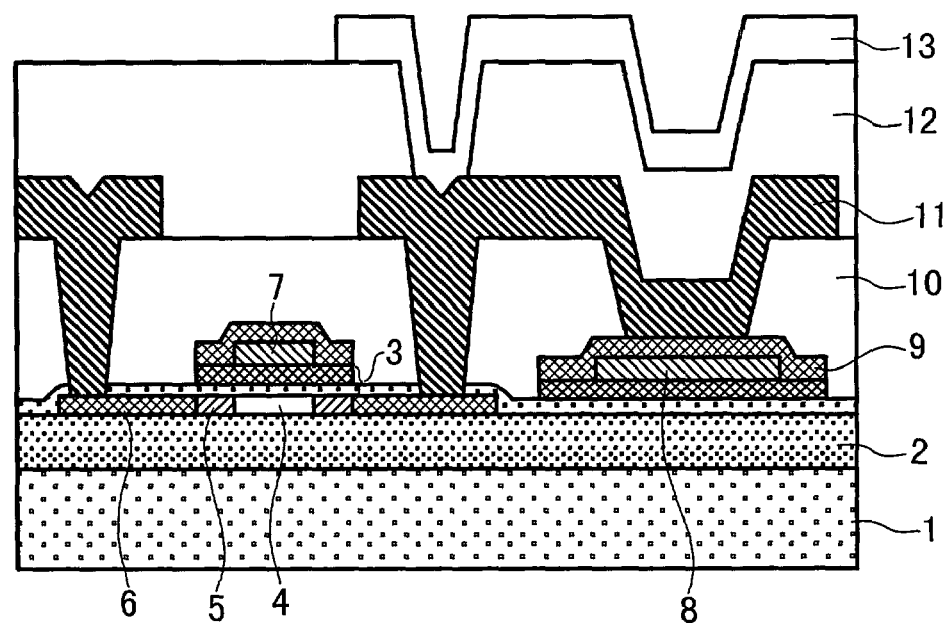
FIG. 13 is a cross sectional view of a thin film transistor and a capacitor according to the embodiments 6 and 7.

FIG. 13 is a cross sectional view taken along the line B–B' in FIG. 5 in the sixth embodiment of the invention and shows a construction obtained after the pixel electrode 13 was formed. FIG. 13 shows a structure obtained in the case where portions formed on the upper surface and side surface of the gate electrode are left when the second insulation film 9 is patterned in the embodiment 5. The second insulation films in the contact portions between the signal-lines and the gate-lines are removed.

According to the embodiment, since a fringe capacitance between the high-resistivity polycrystalline silicon layer 5 and the gate electrode is increased and the resistance of the high-resistivity polycrystalline silicon layer 5 decreases, the performance of the TFT is further improved.

(Embodiment 7)

The seventh embodiment of the invention is obtained by simplifying the manufacturing steps in the first embodiment and its cross sectional view is similar to that of FIG. 13. A manufacturing method in the seventh embodiment will now be described with reference to FIGS. 14A to 14F.

Figure 14A:
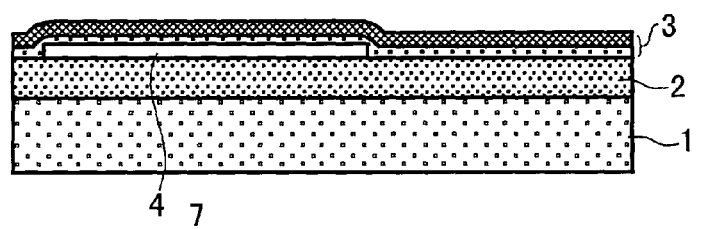
FIGS. 14A to 14F are cross sectional views showing manufacturing steps of the embodiment 7.
Figure 14B:
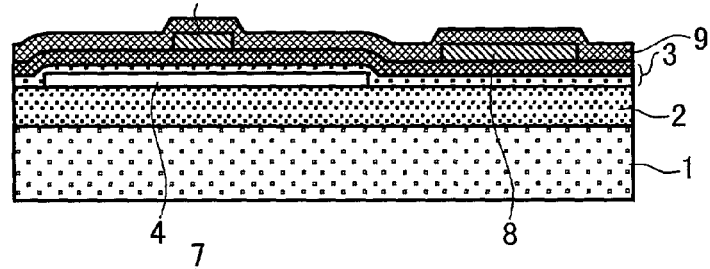
Figure 14C:
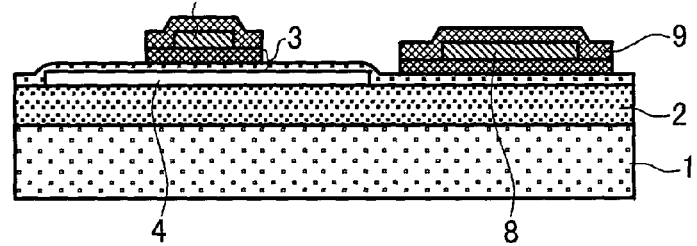
Figure 14D:
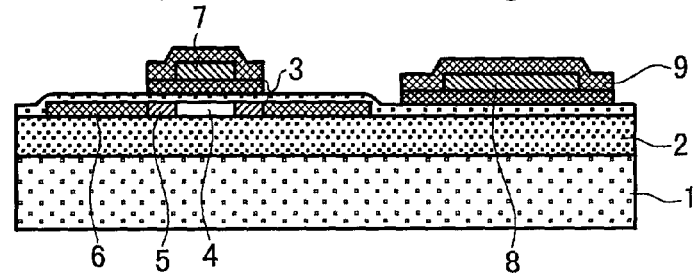
Figure 14E:
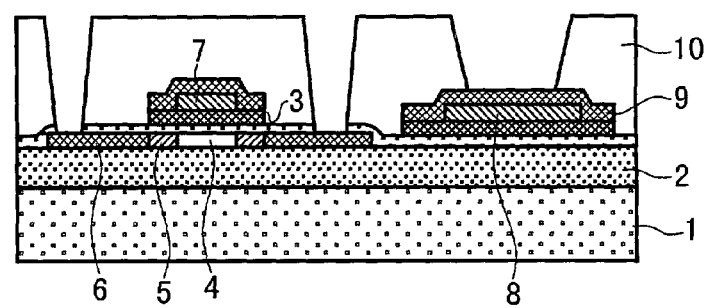
Figure 14F:
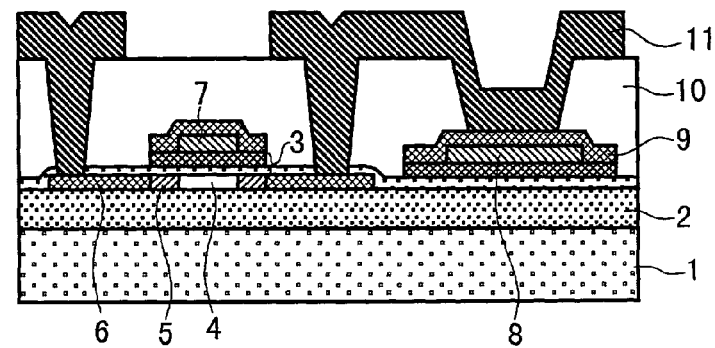

First, in a manner similar to the embodiment 1, the buffer layer 2 and island-shaped polycrystalline silicon layer 4 are formed onto the glass substrate 1. After that, the first insulation film 3 (laminate film of a silicon oxide film and aluminum oxide film in the embodiment) having a thickness of 100 nm and serving as a gate insulation film is formed (FIG. 14A). An Al layer having a thickness of 250 nm and serving as gate-lines, a gate electrode, and a storage electrode is deposited by the sputtering method. The Al layer is patterned by the well-known photo-etching process, thereby forming the gate electrode 7 and, simultaneously, forming the storage electrode 8. Further, the second insulation film 9 (aluminum oxide film in the embodiment) having a thickness of 50 nm is deposited by the sputtering method (FIG. 14B) and patterned by the well-known photo-etching process (FIG. 14C). After that, the regions of the p-channel TFT and the capacitor are covered by a resist and phosphorus ions are implanted. At this time, since a dose of the phosphorus ions in a lower portion of the second insulation film decreases, the high-resistivity n-type polycrystalline silicon layer 5 and low-resistivity n-type polycrystalline silicon layer 6 are simultaneously formed. After that, although not shown, in order to form a TFT CMOS, for the p-channel TFT, a low-resistivity p-type polycrystalline silicon layer is formed by the ion implantation by using the gate electrode 7 as a mask (FIG. 14D). After that, the interlayer insulation film 10 is formed and a contact through hole is opened through a processing step similar to that in the embodiment 1 (FIG. 14E) and the source/drain electrode 11 is formed (FIG. 14F). After that, the passivation film 12 and pixel electrode 13 are formed, thereby obtaining the structure of FIG. 13.

According to the embodiment, since the low-resistivity n-type polycrystalline silicon layer and the high-resistivity n-type polycrystalline silicon layer can be simultaneously formed, the manufacturing steps can be simplified. Further, since the thickness of insulation film on the polysilicon layer upon ion implantation is thin, by reducing an implanting energy, implantation damage can be lightened.

(Embodiment 8)

Figure 15:
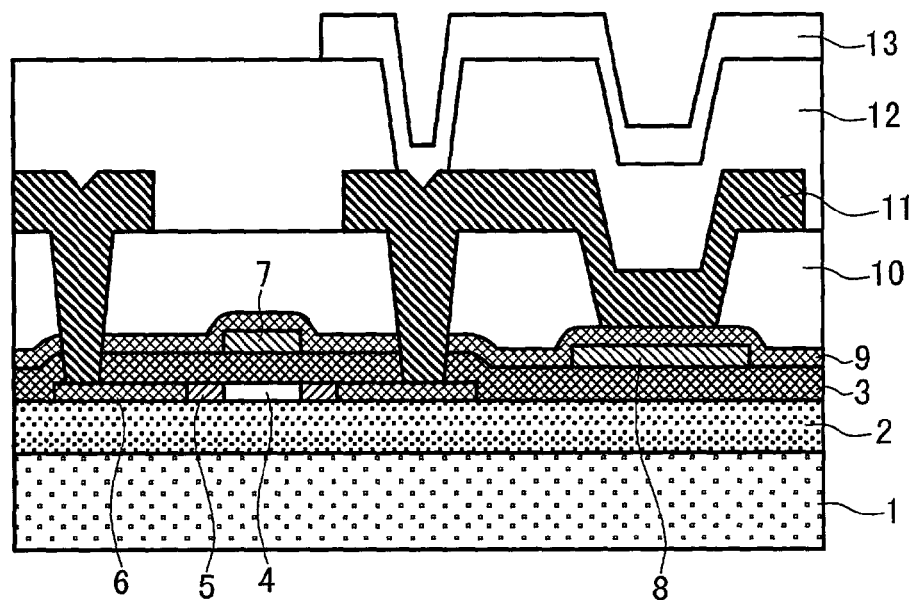
FIG. 15 is a cross sectional view of a thin film transistor and a capacitor according to the embodiment 8.

FIG. 15 is a cross sectional view taken along the line B–B' in FIG. 5 in the eighth embodiment of the invention and shows a construction obtained after the pixel electrode 13 was formed. The pixel TFT and the storage capacitor constructed by the storage electrode 8—the second insulation film 9—the source/drain electrode 11 are shown, respectively. A manufacturing method of the TFT and the storage capacitor will now be described with reference to FIGS. 16A to 16E.

Figure 16A:
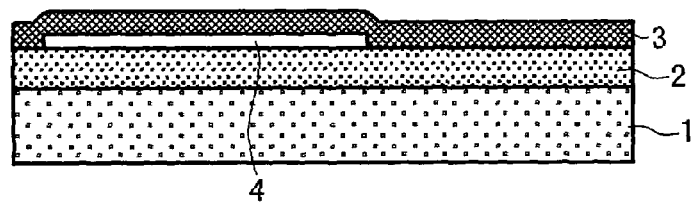
FIGS. 16A to 16E are cross sectional views showing manufacturing steps of the embodiment 8.
Figure 16B:
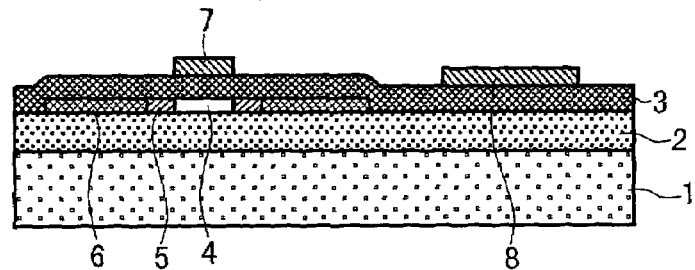
Figure 16C:
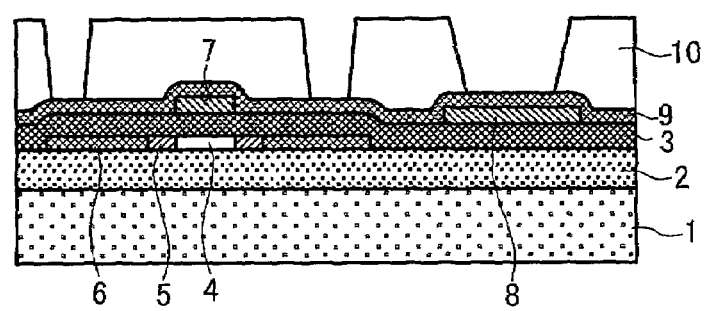
Figure 16D:
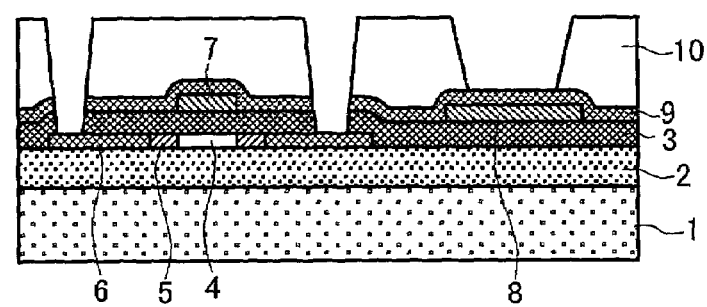
Figure 16E:
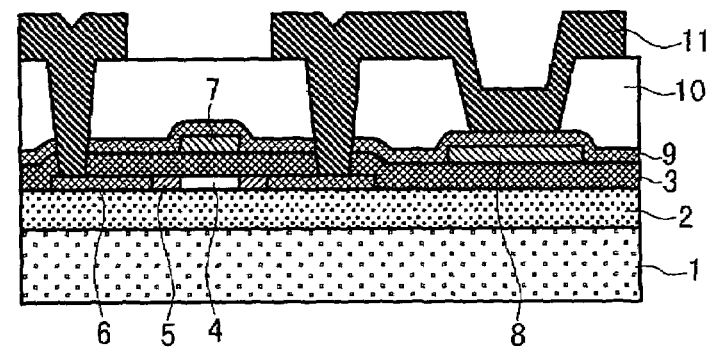

First, in a manner similar to the embodiment 1, the buffer layer 2 and island-shaped polycrystalline silicon layer 4 are formed onto the glass substrate 1. After that, the first insulation film 3 (aluminum oxide film in the embodiment) having a thickness of 100 nm and serving as a gate insulation film is formed (FIG. 16A). Further, in a manner similar to the embodiment 1, the gate electrode 7 and storage electrode 8 are formed, and the high-resistivity n-type polycrystalline silicon layer 5, low-resistivity n-type polycrystalline silicon layer 6, and a low-resistivity p-type polycrystalline silicon layer are formed (FIG. 16B). The second insulation film 9 (aluminum oxide film in the embodiment) having a thickness of 50 nm is deposited by the sputtering method. Subsequently, the interlayer insulation film 10 is formed. After that, the interlayer insulation films on the contact region and the storage electrode are removed by dry etching (FIG. 16C). Further, the second insulation film on the storage electrode is covered by a resist, the first and second insulation films on the contact region are removed, and a contact hole is opened (FIG. 16D). After that, the source/drain electrode 11 is formed (FIG. 16E) via a processing step similar to that in the embodiment 1. After that, the passivation film 12 and pixel electrode 13 are formed, thereby obtaining the structure of FIG. 15.

According to the embodiment, since the second insulation film has a sufficient etching selective ratio for the interlayer insulation film and the polysilicon film is not etched by over etching upon removal of the interlayer insulation film, the interlayer insulation film of the contact hole opening can be removed by the dry etching. Therefore, since a diameter of the contact hole can be made very small, the integration degree of the circuit is raised, and the peripheral driver circuit can be miniaturized.

(Embodiment 9)

Figure 17:
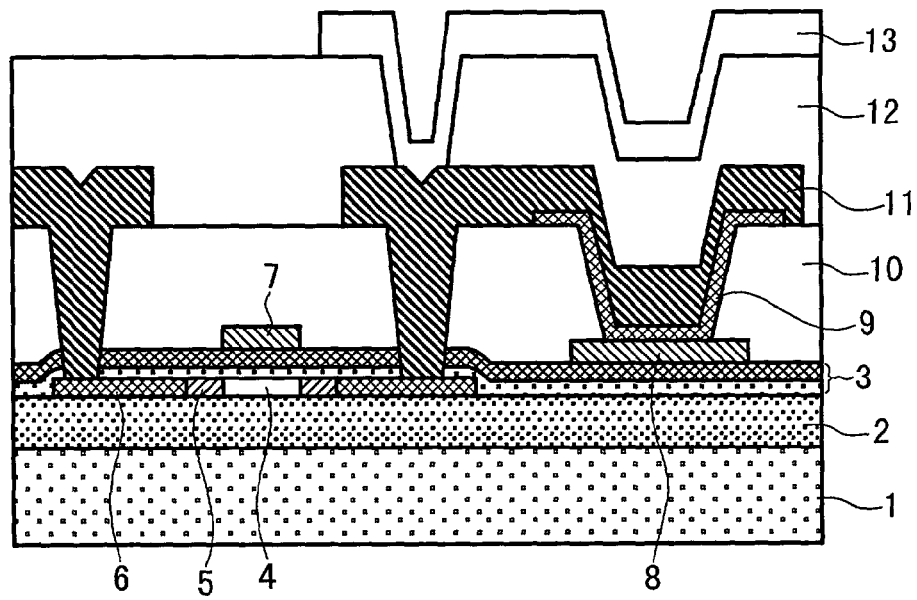
FIG. 17 is a cross sectional view of a thin film transistor and a capacitor according to the embodiment 9.

FIG. 17 is a cross sectional view taken along the line B–B' in FIG. 5 in the ninth embodiment of the invention and shows a construction obtained after the pixel electrode 13 was formed. The pixel TFT and the storage capacitor constructed by the storage electrode 8—the second insulation film 9—the source/drain electrode 11 are shown, respectively. A manufacturing method of the TFT and the storage capacitor will now be described with reference to FIGS. 18A to 18F.

Figure 18A:
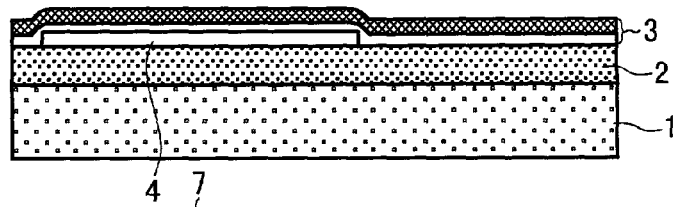
FIGS. 18A to 18F are cross sectional views showing manufacturing steps of the embodiment 9.
Figure 18B:
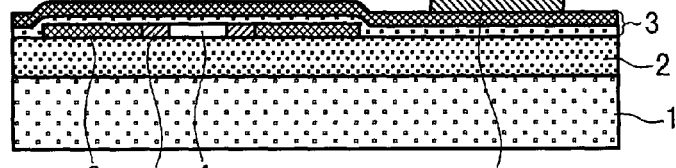
Figure 18C:
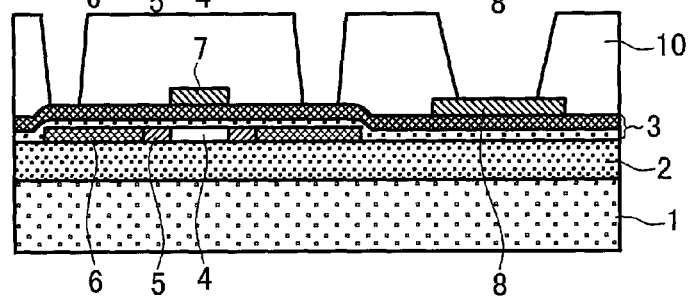
Figure 18D:
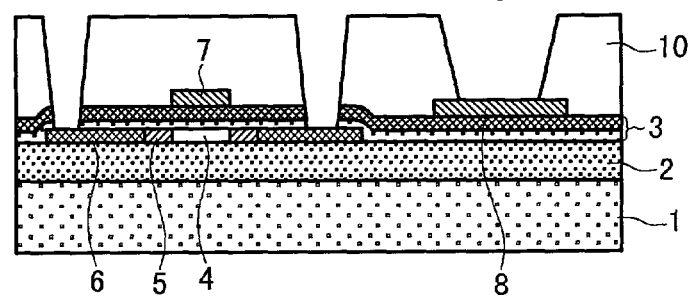
Figure 18E:
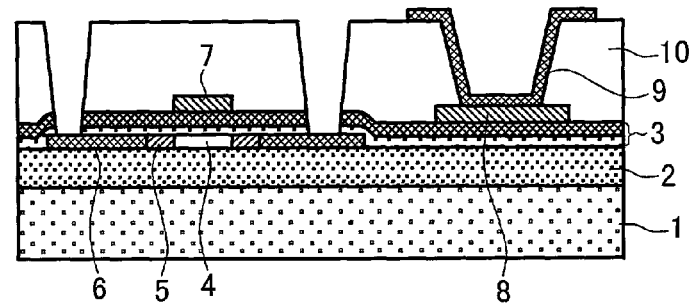
Figure 18F:
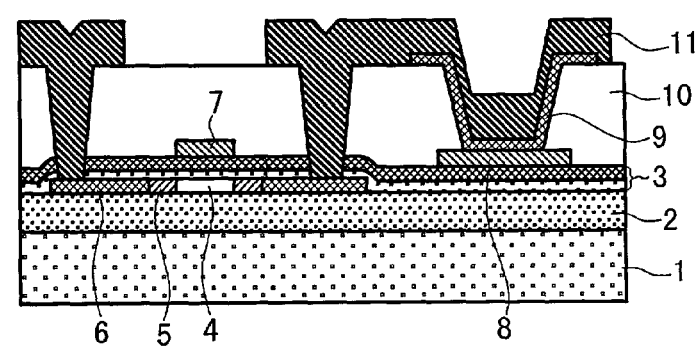

First, in a manner similar to the embodiment 1, the buffer layer 2 and island-shaped polycrystalline silicon layer 4 are formed onto the glass substrate 1. After that, the first insulation film 3 (laminate film of the silicon oxide film and the aluminum oxide film in the embodiment) having a thickness of 100 nm and serving as a gate insulation film is formed (FIG. 18A). Further, in a manner similar to the embodiment 1, the gate electrode 7 and storage electrode 8 are formed, and the high-resistivity n-type polycrystalline silicon layer 5, low-resistivity n-type polycrystalline silicon layer 6, and a low-resistivity p-type polycrystalline silicon layer are formed (FIG. 18B). Subsequently, the interlayer insulation film 10 having a thickness of 500 nm and made of silicon oxide is formed so as to cover the whole surface. After that, the interlayer insulation films on the contact region and the storage electrode are removed by dry etching (FIG. 18C). Further, the first insulation film on the contact region is removed, thereby opening a contact hole (FIG. 18D). The second insulation film 9 (aluminum oxide film in the embodiment) having a thickness of 50 nm is deposited by the sputtering method and patterned by the well-known photo-etching process (FIG. 18E). After that, the source/drain electrode 11 is formed (FIG. 18F) via a processing step similar to that in the embodiment 1. The passivation film 12 and pixel electrode 13 are further formed, thereby obtaining the structure of FIG. 17.

According to the embodiment, since the first insulation film has a sufficient etching selective ratio for the interlayer insulation film and the polysilicon film is not etched by over etching upon removal of the interlayer insulation film, the interlayer insulation film of the contact hole opening can be removed by the dry etching. Therefore, since a diameter of the contact hole can be made very small, the integration degree of the circuit is raised, and the peripheral driver circuit can be miniaturized.

According to the embodiment, since the second insulation film is formed after the interlayer insulation film is removed, damage to which the second insulation film is subjected when the interlayer insulation film is etched can be avoided. It is, therefore, effective for suppressing undesirable lowering of the relative permittivity and a breakdown voltage.

According to the embodiment, since the interlayer insulation film on the storage electrode is removed after completion of activation of impurities and the second insulation film is formed, the highest processing temperature which is applied to the second insulation film can be set to about 100° C. Therefore, even if an insulation film made of an organic material is used as a second insulation film, since the film is not thermally decomposed by a heat treatment, it can be applied to a capacitor. If the organic material is used, a large capacitance can be realized by using $\pi$ electrons of a benzene. To improve a TFT property by a hydrogenation annealing treatment, it is desirable to set a heat resistant temperature of the organic material to 200°0 C. or higher.

(Embodiment 10)

Figure 19:
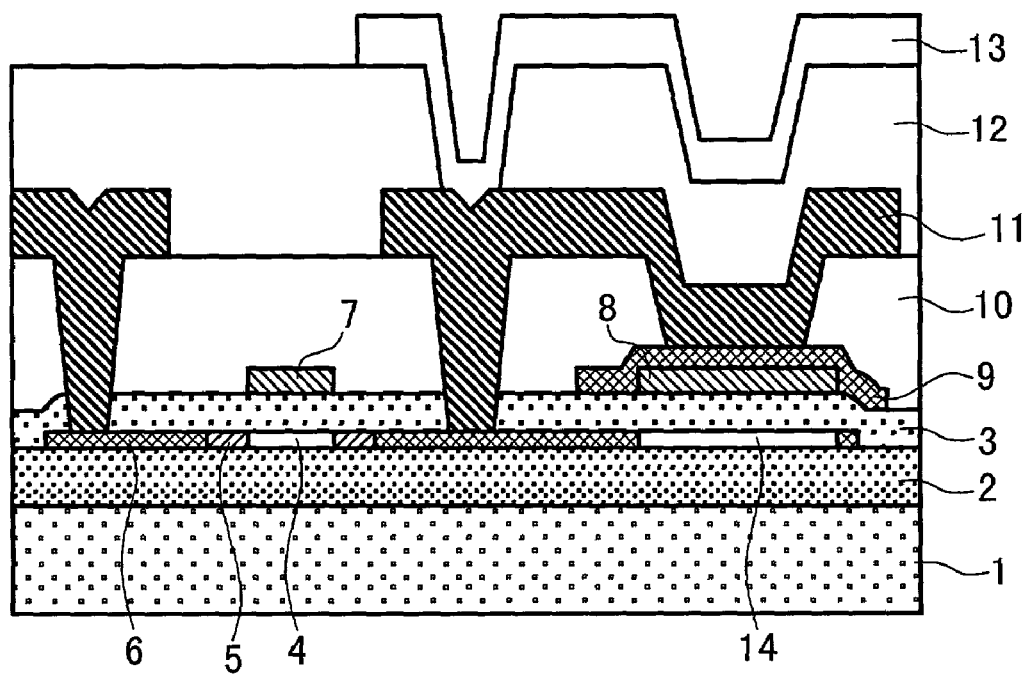
FIG. 19 is a cross sectional view of a thin film transistor and a capacitor according to the embodiment 10.

FIG. 19 is a cross sectional view taken along the line B–B' in FIG. 5 in the tenth embodiment of the invention and shows a construction obtained after the pixel electrode 13 was formed. The pixel TFT and a parallel capacitor comprising a first capacitor constructed by the polycrystalline silicon layer 14—the first insulation film 3—the storage electrode 8 and a second capacitor constructed by the storage electrode 8—the second insulation film 9—the source/drain electrode 11 are shown, respectively.

The tenth embodiment is similar to the embodiment 1 except that a polysilicon layer has been patterned in a lower portion of a storage capacitor and the storage capacitor comprising the polycrystalline silicon layer 14—the first insulation film 3—the storage electrode 8 is formed. The storage capacitor according to the tenth embodiment is the parallel capacitor comprising: the first capacitor constructed by the polycrystalline silicon layer 14—the first insulation film 3—the storage electrode 8; and the second capacitor constructed by the storage electrode 8—the second insulation film 9—the source/drain electrode 11. A capacitance of this capacitor can be increased more than that of the embodiment 1 and the contrast is improved.

By combining the tenth embodiment with any of the embodiments 2 to 9, naturally, each capacitance is increased and the contrast is improved.

(Embodiment 11)

Figure 2:
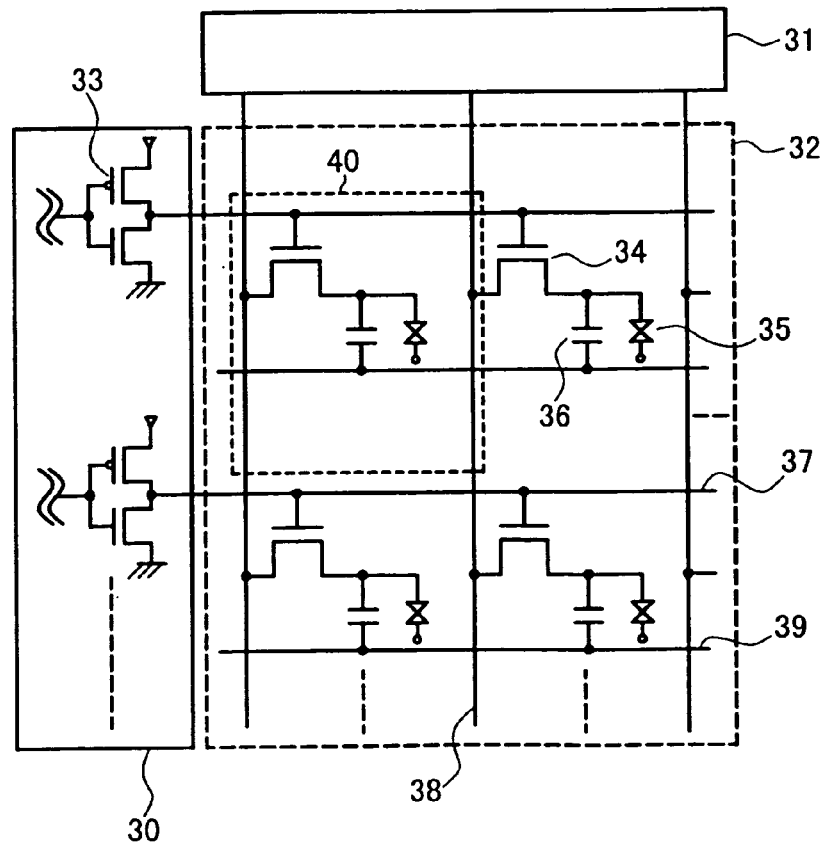
FIG. 2 is a constructional diagram of a conventional liquid crystal display.
Figure 20:
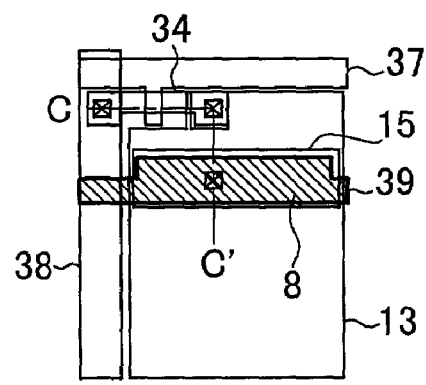
FIG. 20 is a plan view showing a layout of a pixel in a liquid crystal display according to the embodiment 11.
Figure 21:
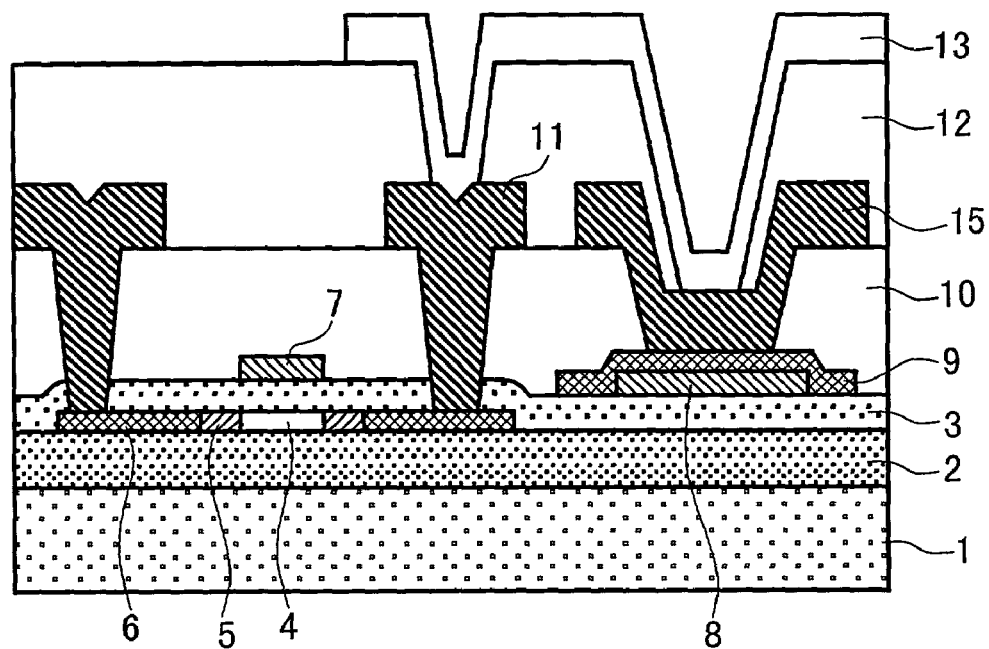
FIG. 21 is a cross sectional view of a thin film transistor and a capacitor constructing the pixel in the embodiment 11.

A constructional diagram of an image display according to the eleventh embodiment of the invention is similar to that of FIG. 2. FIG. 20 is a plan view showing a layout of the pixel 40. FIG. 21 is a cross sectional view taken along the line C–C' in FIG. 20 and shows a construction obtained after the pixel electrode 13 was formed. FIG. 21 shows a structure similar to that of the embodiment 1 except that the TFT and the capacitor are connected via the pixel electrode.

According to the embodiment, the TFT and the capacitor are connected via the pixel electrode. Therefore, the light is also transmitted through a region between the TFT and the capacitor and an aperture ratio is improved. The structure of this embodiment has a similar effect even for the embodiments 2 to 10.

(Embodiment 12)

Figure 22:
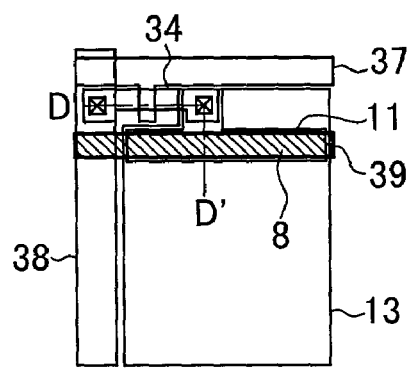
FIG. 22 is a plan view showing a layout of a pixel in a liquid crystal display according to the embodiment 12.
Figure 23:
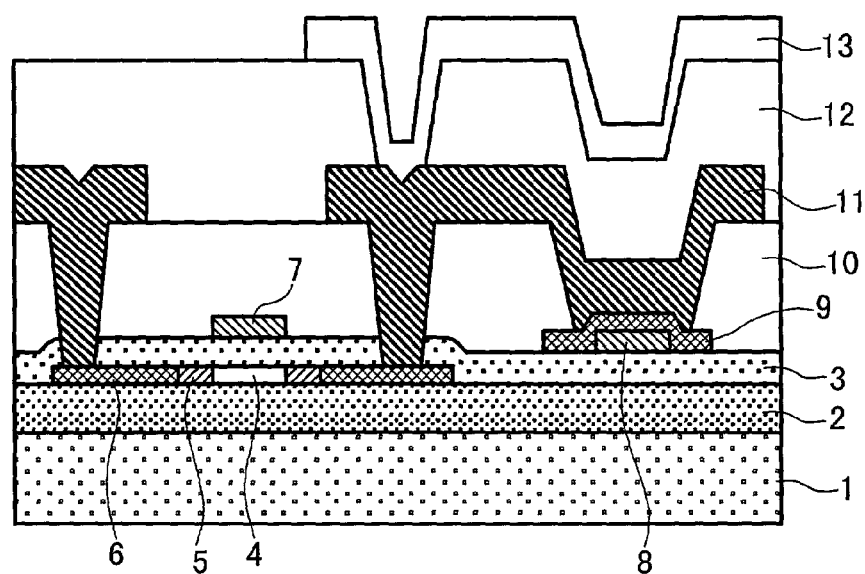
FIG. 23 is a cross sectional view of a thin film transistor and a capacitor constructing the pixel in the embodiment 12.

A constructional diagram of an image display according to the twelfth embodiment of the invention is similar to that of FIG. 2. FIG. 22 is a plan view showing a layout of the pixel 40. FIG. 23 is a cross sectional view taken along the line D–D' in FIG. 22 and shows a construction obtained after the pixel electrode 13 was formed. FIG. 23 shows a structure similar to that of the embodiment 1 except that a capacitor through the second insulation film is formed by using the whole region of the storage electrode.

According to the embodiment, the capacitor through the second insulation film can be formed by using the whole region of the storage electrode and an area of the capacitor can be more reduced. Thus, an aperture ratio is improved. The structure of this embodiment has a similar effect even for the embodiments 2 to 10.

(Embodiment 13)

Figure 24:
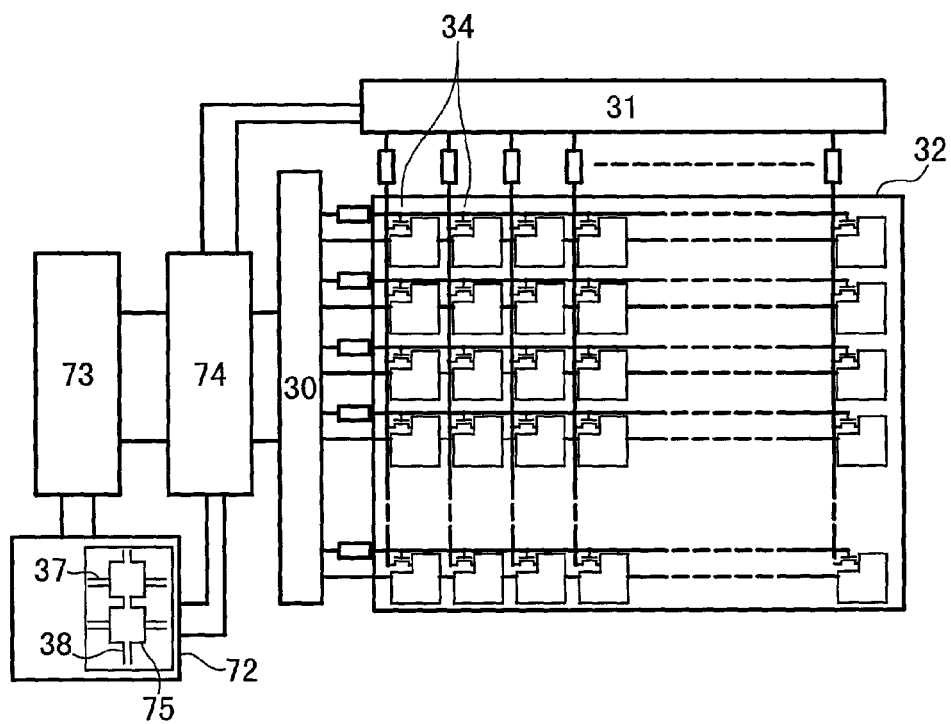
FIG. 24 is a circuit block diagram of a liquid crystal display according to the embodiment 13.

FIG. 24 is a block diagram showing a circuit construction of the TFT drive image display disclosed in the embodiments 1 to 12. A TFT driving circuit as shown in FIG. 24 can be constructed by the TFTs, capacitors, and the like disclosed in the embodiments 1 to 12. That is, each pixel TFT 34 of the display area 32 is controlled by the drain driver circuit 31 and gate driver circuit 30 which are controlled by a control circuit 74. The control circuit 74 is controlled by a main circuit 73 installed by an LSI. A power source is supplied from a power source circuit 72 to each of the main circuit 73 and control circuit 74. In the power source circuit 72, the capacitors disclosed in the embodiments 1 to 9 are arranged in crossing portions of the gate-lines and the signal-lines. Since each capacitor has a large capacitance of about 500 nF, these capacitors play a role for stabilizing a voltage. In case of forming the capacitor having such a large capacitance, according to the invention, since an interval between the electrodes of the capacitor can be narrowed and the relative permittivity of the insulation film can be set to a high value, an area of the capacitor can be reduced, and the peripheral circuit can be miniaturized. Further, the electrode constructing the capacitor has a low resistance and has an excellent frequency property. By providing such capacitors for the control circuit 74, drain driver circuit 31, gate driver circuit 30, or the like, a similar effect can be also derived.

According to the embodiment, by forming the display area 32, control circuit 74, drain driver circuit 31, gate driver circuit 30, and power source circuit 72 onto the same glass substrate and allowing the respective circuits to be built in an image display panel, mounting of the peripheral portion on the substrate becomes possible. Low costs and high reliability of the image display can be realized.

(Embodiment 14)

Figure 25:
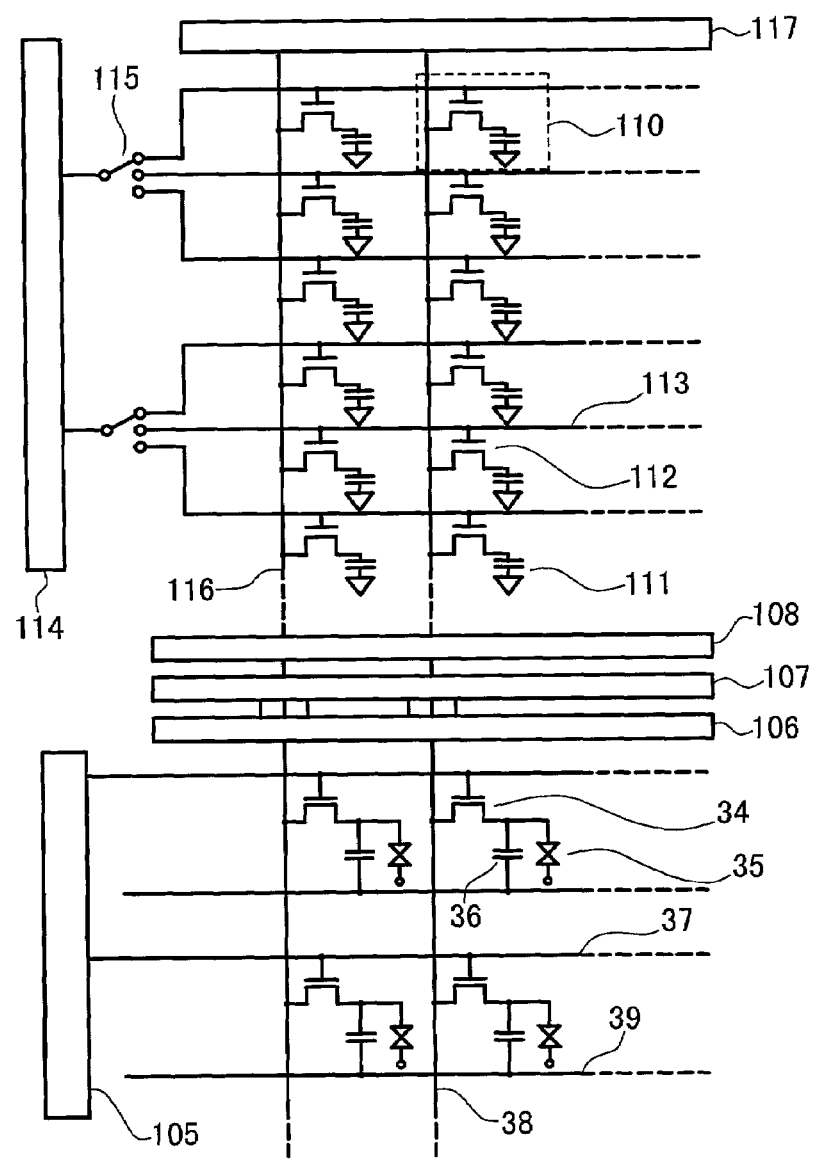
FIG. 25 is a constructional diagram of a liquid crystal display according to the embodiment 14.

FIG. 25 is a constructional diagram of an image display according to the fourteenth embodiment of the invention. Pixels each having the liquid crystal capacitor 35, storage capacitor 36, and pixel TFT 34 are arranged in a matrix shape, the gate of the pixel TFT 34 is connected to a gate-line shift register 105 through the gate-line 37. The drain of the pixel TFT 34 is connected to a DA converter 106 through the signal-line 38. Each memory cell of the frame memories arranged in a matrix shape comprises a memory capacitor 111 and a memory switch 112. A gate of the memory switch 112 is connected to a word-line shift register 114 via a word-line 113 and a word-line selective switch 115 provided at one end of the word-line 113. One end of each memory switch is connected to a data-line 116. A data input circuit 117 is connected to one end of the data-line 116, and a sense amplifier 108 and a latch circuit 107 are provided at the other end. An output of the latch circuit 107 is connected to the DA converter 106. Each of the above component elements is constructed onto the same substrate by using a poly-SiTFT.

Figure 26:
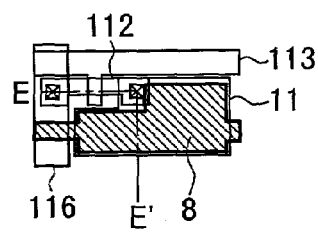
FIG. 26 is a plan view showing a layout of a memory cell in a liquid crystal display according to the embodiment 14.
Figure 27:
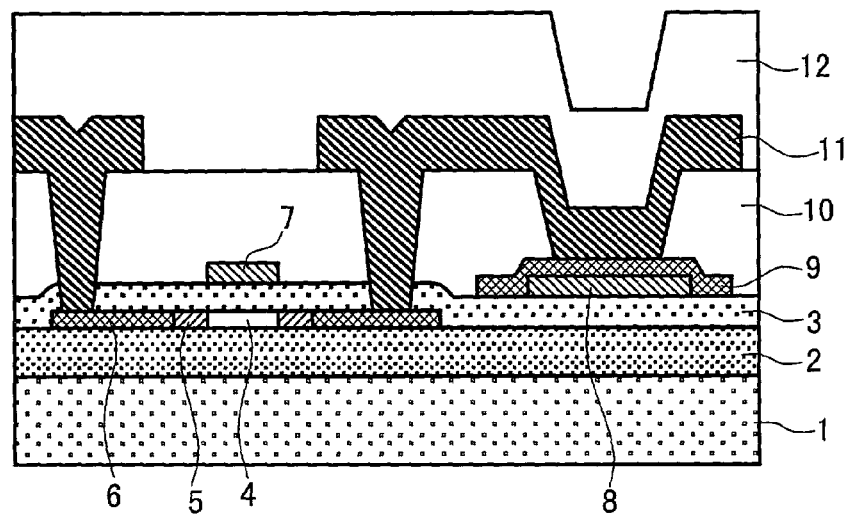
FIG. 27 is a cross sectional view of a thin film transistor and a capacitor constructing the memory cell in the embodiment 14.

FIG. 26 is a plan view of a layout of a memory cell 110 in FIG. 25. FIG. 27 shows a cross sectional view taken along the line E–E' in FIG. 26. The memory capacitor 111 has a structure similar to that of the embodiment 1 and is a capacitor constructed by the storage electrode 8—the second insulation film 9—the source/drain electrode 11.

The operation of the embodiment will now be described hereinbelow. Upon writing, in a manner similar to a general DRAM (Dynamic Random Access Memory), image data is written from the data input circuit 117 into the memory cell of a row selected by the word-line shift register 114 and word-line selective switch 115. Similarly, the image data of the memory cell of the row selected by the word-line shift register 114 and word-line selective switch 115 is inputted to the sense amplifier 108 through the data-line 116 and latched into the latch circuit 107. The latched image data is converted into an analog signal by the DA converter 106. The analog signal is outputted to the signal-line 38. At this time, the gate-line shift register 105 is scanned synchronously with the word-line shift register 114. The gate-line shift register 105 turns on the pixel TFT 34 of a predetermined row through the gate-line 37. Thus, the analog signal is written into the liquid crystal capacitor 35 of a predetermined pixel, and an image display can be performed by using the liquid crystal based on the read-out image data.

The embodiment has been disclosed in detail in, for example, JP-A-11-85065.

According to the embodiment, by allowing the DRAM to be built in the peripheral circuit, a low electric power consumption of the image display can be realized. When the DRAM is built in the peripheral circuit as mentioned above, according to the invention, since the capacitance per unit area can be increased, the area of the memory can be reduced. Thus, the peripheral circuit can be miniaturized.

(Embodiment 15)

Figure 28:
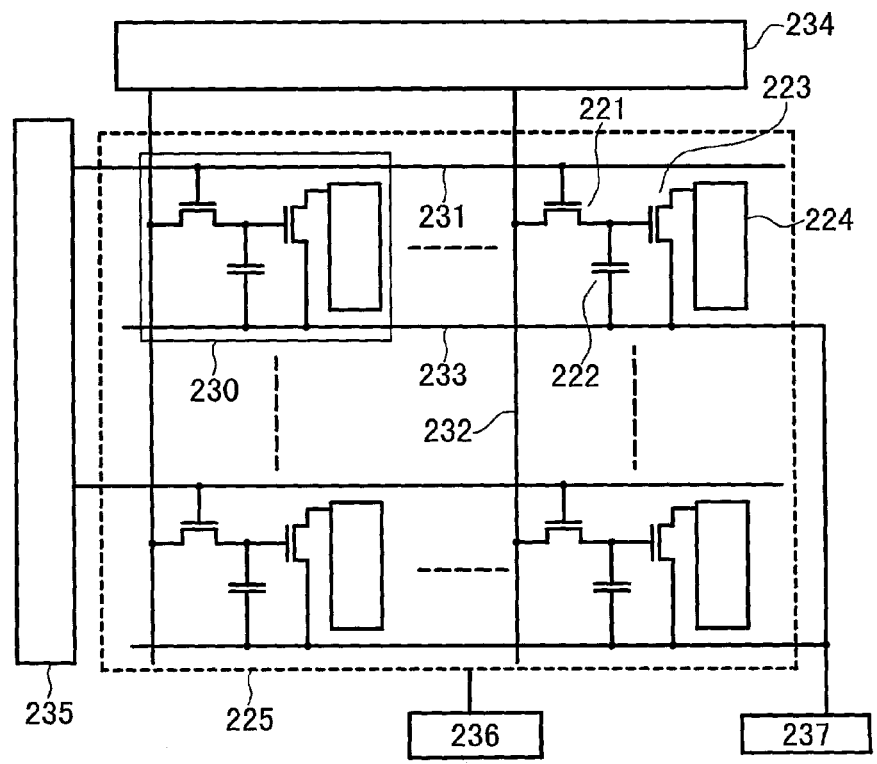
FIG. 28 is a constructional diagram of a liquid crystal display according to the embodiment 15.

FIG. 28 is a constructional diagram of an image display according to the fifteenth embodiment of the invention. Pixels 230 each having a liquid crystal capacitor between a pixel electrode 224 and an opposite electrode 225 are arranged in a display area in a matrix shape. The pixel 230 is connected to a gate-line driver circuit 235 through a gate-line 231 and to a signal-line driver circuit 234 through a signal-line 232. A DRAM constructed by a data input switch 221 and a storage capacitor 222 is provided for the pixel 230. The other end of the data input switch 221 is connected to the signal-line 232. A data node of the DRAM is connected to a gate of a pixel drive switch 223. The liquid crystal capacitor is connected to a common electrode-line 233 through the pixel drive switch 223. The common electrode-line 233 is connected to a common electrode driver circuit 237. The opposite electrode 225 is connected to an opposite electrode driver circuit 236.

Figure 29:
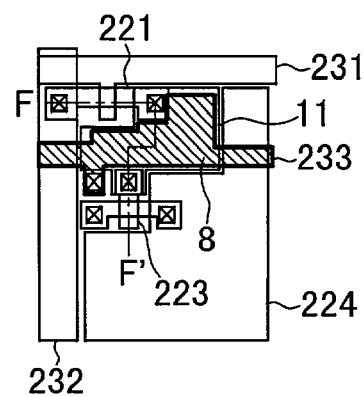
FIG. 29 is a plan view showing a layout of a pixel in the liquid crystal display according to the embodiment 15.
Figure 30:
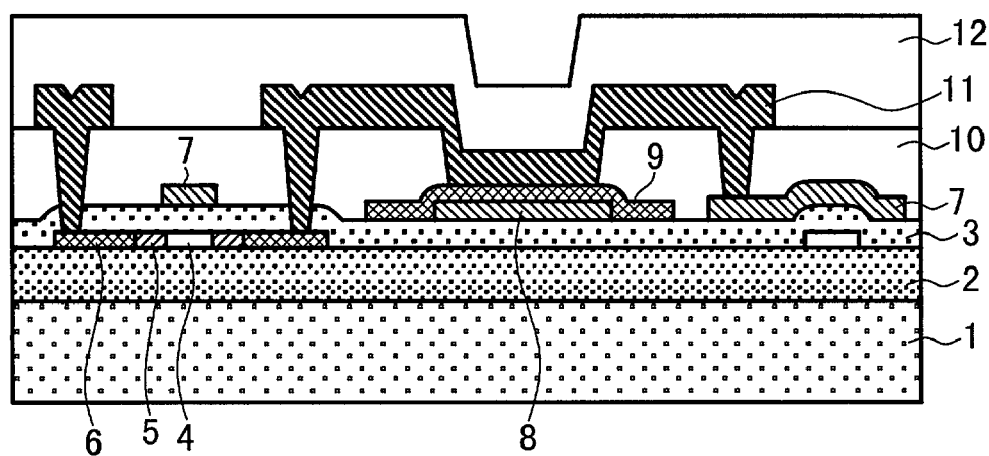
FIG. 30 is a cross sectional view of a thin film transistor and a capacitor constructing the pixel in the embodiment 15.

FIG. 29 shows a plan view of a layout of the pixel 230 shown in FIG. 28. FIG. 30 shows a cross sectional view taken along the line F–F' in FIG. 29. The storage capacitor 222 has a structure similar to that of the embodiment 1 and is a capacitor constructed by the storage electrode 8—the second insulation film 9—the source/drain electrode 11.

The operation of the embodiment will be described hereinbelow. The gate-line driver circuit 235 turns on/off the data input switch 221 of a predetermined pixel row through the gate-line 231, so that the image data of one bit outputted from the signal-line driver circuit 234 to the signal-line 232 is inputted to the DRAM constructed by the data input switch 221 and storage capacitor 222. The pixel drive switch 223 is fixed to the on or off state by the image data written in the DRAM. An AC voltage is applied from the opposite electrode driver circuit 236 to the opposite electrode 225. A predetermined voltage is applied from the common electrode driver circuit 237 to the common electrode-line 233. Therefore, when the pixel drive switch 223 is on, the AC voltage is applied to the liquid crystal capacitor between the pixel electrode 224 and opposite electrode 225. When the pixel drive switch 223 is off, the voltage is never applied to the liquid crystal capacitor. Thus, for a period of time until data in the DRAM is lost by the leakage current, even if the scan of the gate-line 231 by the gate-line driver circuit 235 and the output of the data to the signal-line 232 by the signal-line driver circuit 234 are stopped, the liquid crystal display panel can continue the image display of one bit. To statically maintain the image data, it is sufficient to rewrite the data into the DRAM by periodically and properly performing the scan of the gate-line 231 by the gate-line driver circuit 235 and the output of the data to the signal-line 232 by the signal-line driver circuit 234.

Such an image display of the embodiment as mentioned above has been disclosed in detail in, for example, JP-A-9-258168, or the like.

According to the embodiment, by allowing the DRAM to be built in the pixel, a low electric power consumption of the image display can be realized. If the DRAM is built in the pixel as mentioned above, according to the invention, since the capacitance per unit area can be increased, the area of the storage capacitor can be decreased, so that the aperture ratio can be improved.

(Embodiment 16)

Figure 31:
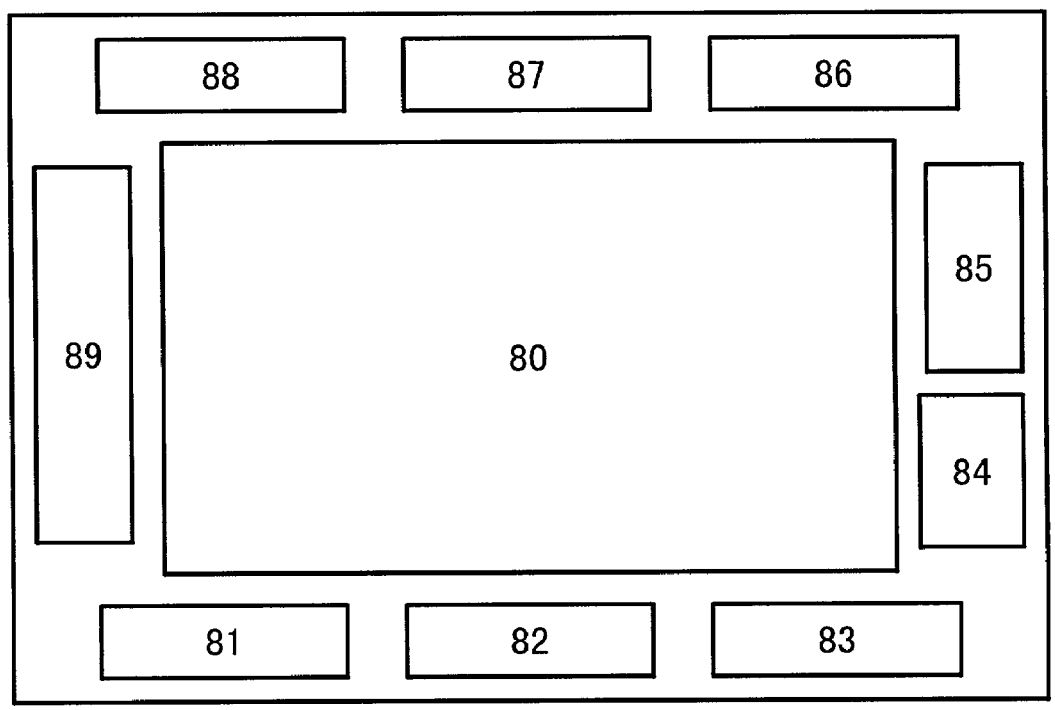
FIG. 31 is a layout diagram of the embodiment 16 in which the liquid crystal display according to the invention is a system on panel.

FIG. 31 is a layout diagram showing a system on panel according to the sixteenth embodiment of the invention. A system on panel shown in FIG. 31 can be constructed by improving the embodiments 13 to 15.

The system on panel is constructed in a manner such that TFT driving circuits 81, 82, and 83, an optical sensor control unit 84, a TFT communication circuit 85, a TFT DRAM 86, a TFT SRAM 87, a TFT processor 88, and a TFT driving circuit 89 are arranged around a rectangular display area 80. Those component elements are assembled onto one glass substrate. TFTs and capacitors are constructed by those disclosed in the embodiments 1 to 5. Therefore, a small system on panel of high performance can be obtained.

In the image displays disclosed in the embodiments 1 to 16 as mentioned above, the substrate can be also replaced with another insulation substrate such as quartz glass, plastic, or the like. As a buffer layer, in place of the silicon oxide film, a silicon nitride film or a laminate film of the silicon oxide film and the silicon nitride film can be also used. If the silicon nitride film is used as a buffer layer, it is possible to effectively prevent impurities in the glass substrate from being diffused and permeated into the gate insulation film.

A low-pressure chemical vapor deposition method can be used as a method of depositing amorphous silicon. A solid phase crystallization method by heat annealing can be used as a method of crystallizing amorphous silicon, or a combination of the heat annealing and laser annealing can be also used.

The barrier metal of the source/drain electrode can be a metal such as Ti, TiW, TiN, W, Cr, Mo, Ta, Nb, V, Zr, Hf, Pt, Ru, or the like, or an alloy of them. As a barrier metal, it is desirable to use a metal material which prevents diffusion into the polysilicon layer, plays a role of reducing a contact resistance with the polysilicon layer, and does not form a reactant layer together with the high dielectric constant film.

In the image displays disclosed in the embodiments 1 to 3, the material for the gate electrode can be a well-known electrode material such as Al, Ti, Ta, or the like. The material for the second insulation film can be a well-known high dielectric constant material such as $Al_2O_3$, $Y_2O_3$, $La_2O_3$, $Ta_2O_5$, $ZrO_2$, $LaAlO_3$, $ZrTiO_4$, $HfO_2$, $SrZrO_3$, $TiO_2$, $SrTiO_3$, $SrBi_2Ta_2O_9$, $(Ba_xSr_{1-x})TiO_3$, $Pb(Zr_yTi_{1-y})O_3$, or the like. The first insulation film can be also made of the well-known high dielectric constant material as mentioned above. In this case, since the removal of the interlayer insulation film and the removal of the gate insulation film are performed by the different steps, the step of opening the contact hole can be performed by the dry etching and the diameter of the contact hole can be made very small. A ferroelectric film made of PZT, PLZT, $BaTiO_3$, $PbTiO_3$, $Bi_4Ti_3O_{12}$ or the like can be also used as a second insulation film. In this case, since the storage capacitor has memory performance, a driving frequency can be lowered and the low electric power consumption can be realized.

In the image displays disclosed in the embodiments 2 and 6, since the high-resistivity polycrystalline silicon layer 5 is not formed in a self-alignment state in the second insulation film, their forming regions do not always coincide.

In the image display disclosed in the embodiment 4, the gate electrode can be made of a well-known electrode material whose oxide film is made of a high dielectric constant material such as Ti, Zr, Hf, Ta, Nb, an alloy thereof, or the like. An oxygen plasma treatment can be also used as an oxidizing method. According to the manufacturing method, after the interlayer insulation film on the storage electrode was removed, the storage electrode can be also oxidized simultaneously with the opening process of the contact through hole. The steps of removing the oxide films on the gate electrode and the gate lines can be omitted, so that the manufacturing steps can be simplified.

In the image display disclosed in the embodiment 5, the a single-layer film made of a well-known high dielectric constant material can be used as a first insulation film. In this case, a gate capacitance is increased and performance of TFT is improved. The second insulation film whose thickness is thinner than that of the second insulation film formed under the gate electrode 7 can be also formed on the low-resistivity n-type polycrystalline silicon layer 6. In this case, the step of opening the contact hole can be performed by the dry etching and the diameter of the contact hole can be made very small.

In the image displays disclosed in the embodiments 5 to 7, the upper layer of the first insulation film and the second insulation film can be the silicon nitride films or can be also made of another well-known high dielectric constant material. They can be also made of different materials. The step of opening the contact hole can be performed by the dry etching and the diameter of the contact hole can be made very small.

In the image display disclosed in the embodiment 8, the first and second insulation films can be also made of another well-known high dielectric constant material or different high dielectric constant materials. The first insulation film can be also the silicon oxide film.

In the image display disclosed in the embodiment 9, the first insulation film can be the silicon oxide film or can be also a single-layer film made of a well-known high dielectric constant material.

In the image display disclosed in the embodiment 14, as a cross sectional structure of the memory cell and the capacitor constructing the pixel and as a plan view of the layout of the pixel, any of those disclosed in the embodiments 1 to 9, 11, and 12 can be used.

In the image display disclosed in the embodiment 15, as a cross sectional structure of the capacitor constructing the pixel and as a plan view of the layout of the pixel, any of those disclosed in the embodiments 1 to 12 can be used. A ferroelectric memory can be formed by using a well-known ferroelectric film as a second insulation film. A phase-change memory can be formed by using a phase-change film of the Ge—Sb—Te system as a second insulation film. An MRAM can be formed by providing a pair of ferromagnetic materials consisting of an alloy of Ni, Fe, and Co, or the like and a nonmagnetic material between them in place of the second insulation film.

According to the invention, if the image display is designed so as to have the contrast that is almost equivalent to the conventional one, an electric power of the backlight can be reduced owing to the improvement of the aperture ratio, so that the low electric power consumption of the display can be realized. The invention can be applied to all image displays in which the storage capacitor for storing the signal voltage is provided for each pixel, like an image display using electroluminescence.

Although the embodiments have been disclosed with respect to the image displays using the top-gate type TFT, the invention can be also applied to an image display using a bottom-gate type TFT. A part of the gate-lines at the front stage can be also used as a storage electrode. Further, the invention can be also applied to a semiconductor integrated circuit, portable equipment, and the like.

According to the invention, by providing the capacitors each constructed by the electrode of the same layer as that of the gate-lines, the electrode of the same layer as that of the signal-lines, and the insulation film between those electrodes, the image display in which the contrast is high and the manufacturing costs are low can be provided.

It will be further understood by those skilled in the art that the foregoing description has been made on embodiments of the invention and that various changes and modifications may be made in the invention without departing from the spirit of the invention and scope of the appended claims.

What is claimed is:

1. An image display having a plurality of thin film transistors and a plurality of capacitors on a substrate, wherein a plurality of gate-lines and a plurality of signal-lines which cross said plurality of gate-lines in a matrix shape are formed on said substrate, each of said thin film transistors has: an island-shaped semiconductor layer having a source region, a drain region, and a channel region sandwiched between them; a first insulation film formed between said island-shaped semiconductor layer and a gate electrode of the same layer as that of said gate-lines; an interlayer insulation film formed above said island-shaped semiconductor layer; and a source electrode and a drain electrode which are come into contact with said source region and said drain region via an opening formed in said interlayer insulation film and which exist in the same layer as that of the signal-lines, and each of said capacitors has: a storage electrode of the same layer as that of said gate-lines; a second insulation film formed in contact with said storage electrode, an upper surface of said interlayer insulation film, and a side surface of the opening formed in said interlayer insulation film; and an electrode which is formed on said second insulation film so as to be in contact therewith and which exists in the same layer as that of said signal-lines.

2. A display according to claim 1, wherein relative permittivity of said second insulation film is higher than that of said first insulation film.

3. A display according to claim 1, wherein said second insulation film is an insulation film made of an organic material.

4. A display according to claim 1, wherein each of said capacitors is a parallelly-connected capacitor consisting of a first capacitor and a second capacitor, said first capacitor is formed by said island-shaped semiconductor layer, said first insulation film and said storage electrode, and said second capacitor is formed by said storage electrode, said second insulation film and an electrode which is formed on said second insulation film so as to be in contact therewith and which exists in the same layer as that of said signal-lines.

5. A manufacturing method of an image display, comprising the steps of:

forming a plurality of island-shaped semiconductor layers onto a substrate;

forming a first insulation film onto said island-shaped semiconductor layers;

forming a gate electrode and a storage electrode onto said first insulation film;

forming a source region, a drain region, and a channel region sandwiched between them onto said island-shaped semiconductor layers;

forming a second insulation film onto said storage electrode;

patterning said second insulation film, and etching only said second insulation film so as to be in contact only with an upper surface and side surfaces of said storage electrode and an upper surface of said first insulation film;

forming interlayer insulation films onto regions above said gate electrode and said storage electrode;

simultaneously removing said interlayer insulation film of a contact hole portion and said interlayer insulation film above said storage electrode; and simultaneously forming an electrode on said second insulation film and a source electrode and a drain electrode which are connected to said source region and said drain region.

6. A method according to claim 5, wherein said second insulation film is formed to an upper portion and a side portion of said gate electrode simultaneously with said step of forming the second insulation film onto said storage electrode.

7. A manufacturing method according to claim 5, wherein said first insulation film and said interlayer insulation films are made of silicon oxide.

* * * * *